(12) United States Patent
Waldo et al.

(10) Patent No.: US 6,247,026 B1
(45) Date of Patent: *Jun. 12, 2001

(54) METHOD, APPARATUS, AND PRODUCT FOR LEASING OF DELEGATION CERTIFICATES IN A DISTRIBUTED SYSTEM

(75) Inventors: James H. Waldo, Dracut; Ann M. Wollrath, Groton; Robert Scheifler, Somerville, all of MA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/044,838

(22) Filed: Mar. 20, 1998

Related U.S. Application Data

(63) Continuation-in-part of application No. 08/729,421, filed on Oct. 11, 1996, now Pat. No. 5,832,529.
(60) Provisional application No. 60/076,048, filed on Feb. 26, 1998.

(51) Int. Cl.[7] ................................................. G06F 17/30
(52) U.S. Cl. ............................ 707/206; 707/9; 707/10; 707/201; 707/205; 709/104; 709/203
(58) Field of Search .................................. 707/10, 104, 9, 707/201, 205, 206; 709/104, 203

(56) References Cited

U.S. PATENT DOCUMENTS

| | | |
|---|---|---|
| 4,491,946 | 1/1985 | Kryskow, Jr. et al. ............... 370/453 |
| 4,713,806 | 12/1987 | Oberlander et al. ................. 370/358 |

(List continued on next page.)

FOREIGN PATENT DOCUMENTS

| | | | |
|---|---|---|---|
| 0 300 516 | 1/1989 | (EP) . | |
| 0 351 536 A2 | 1/1990 | (EP) | ................................. G06F/9/46 |
| 0 351 536 A3 | 1/1990 | (EP) | ................................. G06F/9/46 |
| 0 384 339 | 8/1990 | (EP) . | |
| 0 472 874 | 3/1992 | (EP) . | |
| 0 474 340 | 3/1992 | (EP) . | |
| 0 497 022 A1 | 8/1992 | (EP) . | |
| 0 555 997 | 8/1993 | (EP) . | |

(List continued on next page.)

OTHER PUBLICATIONS

Chung, Kin–Man and Yuen, Herbert, "A 'Tiny' Pascal Compiler: Part 1: The P–Code Interpreter," BYTE Publications, Inc., pp. 58–155, Sep. 1978.

Chun, Kin–Man and Yuen, Herbert, "A 'Tiny' Pascal Compiler: Part 2: The P–Compiler," BYTE Publications, Inc., pp. 34–52, Oct. 1978.

Thompson, Ken, "Regular Expression Search Algorithm," Programming Techniques, Communications of the ACM, vol. 11, No. 6, pp. 419–422, Jun., 1968.

(List continued on next page.)

*Primary Examiner*—Jack Choules
*Assistant Examiner*—Cheryl Lewis
(74) *Attorney, Agent, or Firm*—Finnegan, Henderson, Farabow, Garrett & Dunner, L.L.P.

(57) ABSTRACT

A method, apparatus, and product for leasing a delegation certificate in a distributed processing system is provided. Consistent with this method, apparatus, and product, a delegatee requests from a delegator access to a resource for a period of time that the delegator has authority to access. Responsive to this request, the delegator determines an appropriate lease period during which time the delegatee has authority to access to the resource.

46 Claims, 13 Drawing Sheets

U.S. PATENT DOCUMENTS

| | | | |
|---|---|---|---|
| 4,809,160 | 2/1989 | Mahon et al. | 713/200 |
| 4,823,122 | 4/1989 | Mann et al. | 340/825.28 |
| 4,939,638 | 7/1990 | Stephenson et al. | 710/244 |
| 4,956,773 | 9/1990 | Saito et al. | 717/3 |
| 5,088,036 | 2/1992 | Ellis et al. | |
| 5,109,486 | 4/1992 | Seymour | 709/224 |
| 5,187,787 | 2/1993 | Skeen et al. | 395/600 |
| 5,218,699 | 6/1993 | Brandle et al. | 709/328 |
| 5,257,369 | 10/1993 | Skeen et al. | 395/650 |
| 5,293,614 * | 3/1994 | Ferguson et al. | 395/600 |
| 5,297,283 | 3/1994 | Kelly, Jr. et al. | 709/104 |
| 5,311,591 | 5/1994 | Fischer | 713/156 |
| 5,339,435 | 8/1994 | Lubkin et al. | 717/11 |
| 5,386,568 | 1/1995 | Wold et al. | 717/10 |
| 5,390,328 | 2/1995 | Frey et al. | 709/315 |
| 5,423,042 | 6/1995 | Jalili et al. | 709/328 |
| 5,440,744 | 8/1995 | Jacobson et al. | 709/203 |
| 5,448,740 | 9/1995 | Kiri et al. | 717/8 |
| 5,452,459 | 9/1995 | Drury et al. | 707/3 |
| 5,455,952 | 10/1995 | Gjovaag | 717/1 |
| 5,471,629 | 11/1995 | Risch | 707/201 |
| 5,475,792 | 12/1995 | Stanford et al. | 704/233 |
| 5,475,817 | 12/1995 | Waldo et al. | 709/316 |
| 5,481,721 | 1/1996 | Serlet et al. | 709/315 |
| 5,504,921 | 4/1996 | Dev et al. | 709/223 |
| 5,511,197 | 4/1996 | Hill et al. | 709/328 |
| 5,524,244 | 6/1996 | Robinson et al. | 717/5 |
| 5,553,282 | 9/1996 | Parrish et al. | 707/10 |
| 5,555,367 | 9/1996 | Premerlani et al. | 707/4 |
| 5,557,798 | 9/1996 | Skeen et al. | 395/650 |
| 5,560,003 | 9/1996 | Nilsen et al. | |
| 5,561,785 * | 10/1996 | Blandy et al. | 395/497.01 |
| 5,577,231 | 11/1996 | Scalzi et al. | 703/26 |
| 5,603,031 | 2/1997 | White et al. | 395/683 |
| 5,617,537 | 4/1997 | Yamada et al. | 709/214 |
| 5,628,005 | 5/1997 | Hurvig | 707/8 |
| 5,640,564 | 6/1997 | Hamilton et al. | 709/315 |
| 5,644,768 | 7/1997 | Periwal et al. | 709/102 |
| 5,652,888 | 7/1997 | Burgess | 709/318 |
| 5,655,148 | 8/1997 | Richman et al. | 395/828 |
| 5,659,751 | 8/1997 | Heninger | 395/600 |
| 5,671,225 | 9/1997 | Hooper et al. | 370/468 |
| 5,675,796 | 10/1997 | Hodges et al. | 709/100 |
| 5,680,573 * | 10/1997 | Rubin et al. | 395/456 |
| 5,680,617 | 10/1997 | Gough et al. | 707/104 |
| 5,684,955 | 11/1997 | Meyer et al. | 709/316 |
| 5,689,709 | 11/1997 | Corbett et al. | 709/315 |
| 5,706,435 * | 1/1998 | Barbara et al. | 395/200.09 |
| 5,724,588 | 3/1998 | Hill et al. | 709/328 |
| 5,727,145 | 3/1998 | Nessett et al. | 713/200 |
| 5,737,607 | 4/1998 | Hamilton et al. | 717/1 |
| 5,745,678 | 4/1998 | Herzberg et al. | 713/200 |
| 5,745,695 | 4/1998 | Gilchrist et al. | 709/227 |
| 5,745,703 | 4/1998 | Cetjin et al. | 709/238 |
| 5,754,849 | 5/1998 | Dyer et al. | 455/404 |
| 5,757,925 | 5/1998 | Faybishenko | 709/203 |
| 5,761,656 | 6/1998 | Ben-Shachar | 707/4 |
| 5,764,897 | 6/1998 | Khalidi | 709/201 |
| 5,768,532 | 6/1998 | Megerian | 709/245 |
| 5,774,551 | 6/1998 | Wu et al. | 713/155 |
| 5,778,228 | 7/1998 | Wei | 709/328 |
| 5,778,368 | 7/1998 | Hogan et al. | 707/10 |
| 5,787,425 | 7/1998 | Bigus | 707/6 |
| 5,787,431 | 7/1998 | Shaughnessy | 707/100 |
| 5,790,548 | 8/1998 | Sistanizadeh et al. | 370/401 |
| 5,809,507 | 9/1998 | Cavanaugh, III | 707/103 |
| 5,813,013 | 9/1998 | Shakib et al. | 707/102 |
| 5,815,149 | 9/1998 | Mutschler, III et al. | 345/335 |
| 5,815,709 | 9/1998 | Waldo et al. | 712/300 |
| 5,815,711 | 9/1998 | Sakamoto et al. | 717/1 |
| 5,829,022 | 10/1998 | Watanabe et al. | 711/118 |
| 5,832,529 | 11/1998 | Wollrath et al. | 707/206 |
| 5,832,593 | 11/1998 | Wurst et al. | 29/750 |
| 5,835,737 | 11/1998 | Sand et al. | 710/113 |
| 5,842,018 | 11/1998 | Atkinson et al. | 707/501 |
| 5,844,553 | 12/1998 | Hao et al. | 345/329 |
| 5,845,129 | 12/1998 | Wendorf et al. | 710/200 |
| 5,860,004 | 1/1999 | Fowlow et al. | 717/1 |
| 5,860,153 | 1/1999 | Matena et al. | 711/216 |
| 5,864,862 | 1/1999 | Kriens et al. | 707/103 |
| 5,864,866 | 1/1999 | Henckel et al. | 707/103 |
| 5,872,928 | 2/1999 | Lewis et al. | 709/222 |
| 5,875,335 | 2/1999 | Beard | 717/5 |
| 5,878,411 | 3/1999 | Borroughs et al. | 707/4 |
| 5,884,024 | 3/1999 | Lim et al. | 713/201 |
| 5,884,079 | 3/1999 | Furusawa | 717/1 |
| 5,887,134 | 3/1999 | Ebrahim | 709/200 |
| 5,890,158 | 3/1999 | House et al. | 707/10 |
| 5,892,904 | 4/1999 | Atkinson et al. | 713/201 |
| 5,933,497 | 8/1999 | Beetcher et al. | 705/59 |
| 5,935,249 | 8/1999 | Stern et al. | 713/201 |
| 5,940,827 | 8/1999 | Hapner et al. | 707/8 |
| 5,946,485 | 8/1999 | Weeren et al. | 717/3 |
| 5,946,694 | 8/1999 | Copeland et al. | 707/103 |
| 5,966,531 | 10/1999 | Skeen et al. | 709/315 |
| 6,003,763 | 12/1999 | Gallagher et al. | 235/379 |
| 6,009,103 | 12/1999 | Woundy | 370/401 |
| 6,061,699 | 5/2000 | DiCecco et al. | 707/513 |
| 6,061,713 | 5/2000 | Bharadhwaj | 709/203 |

FOREIGN PATENT DOCUMENTS

| | | | |
|---|---|---|---|
| 0 565 849 | 10/1993 | (EP) . | |
| 0 569 195 A2 | 11/1993 | (EP) | H04Q/3/545 |
| 0 569 195 A3 | 11/1993 | (EP) | H04Q/3/545 |
| 0 625 750 | 11/1994 | (EP) . | |
| 0 635 792 | 1/1995 | (EP) . | |
| 0 651 328 | 5/1995 | (EP) . | |
| 0 660 231 | 6/1995 | (EP) . | |
| 0 697 655 | 2/1996 | (EP) . | |
| 0 718 761 | 6/1996 | (EP) . | |
| 0 767 432 | 4/1997 | (EP) . | |
| 0 778 520 | 6/1997 | (EP) . | |
| 0 794 493 | 9/1997 | (EP) . | |
| 0 803 810 | 10/1997 | (EP) . | |
| 0 803 811 | 10/1997 | (EP) . | |
| 0 805 393 | 11/1997 | (EP) . | |
| 0 810 524 | 12/1997 | (EP) . | |
| 0 817 020 | 1/1998 | (EP) . | |
| 0 817 022 | 1/1998 | (EP) . | |
| 0 817 025 | 1/1998 | (EP) . | |
| 0 836 140 A2 | 4/1998 | (EP) | G06F/09/46 |
| 2 253 079 | 8/1992 | (GB) . | |
| 2 262 825 | 6/1993 | (GB) . | |
| 2 305 087 | 3/1997 | (GB) . | |
| 11-45187 | 2/1999 | (JP) | G06F/09/46 |
| WO92/07335 | 4/1992 | (WO) . | |
| WO92/09948 | 6/1992 | (WO) . | |
| WO93/25962 A1 | 12/1993 | (WO) . | |
| WO94/03855 | 2/1994 | (WO) . | |
| WO96/03692 | 2/1996 | (WO) . | |
| WO96/10787 | 4/1996 | (WO) . | |
| WO96/18947 | 6/1996 | (WO) . | |
| WO96/24099 | 8/1996 | (WO) . | |
| WO98/02814 | 1/1998 | (WO) . | |
| WO98/04971 | 2/1998 | (WO) . | |

OTHER PUBLICATIONS

Mitchell, James G., et al., "Mesa Language Manual," Xerox Corporation, Palo Alto Research Centers.

McDaniel, Gene, "An Analysis of a Mesa Instruction Set," Xerox Corporation, Palo Alto Research Centers, May 1982.

Pier, Kenneth A., "A Retrospective on the Dorado, A High-Performance Personal Computer," Xerox Corporation, Palo Alto Research Centers, Aug. 1983.

Pier, Kenneth A., "A Retrospective on the Dorado, A High-Performance Personal Computer," Conference Proceedings, The 10th Annual International Symposium on Computer Architecture, Royal Institute of Technology, Stockholm, Sweden, 1983.

Birrell, Andrew, et al., "Distributed Garbage Collection for Network Objects," Digital Systems Research Center, Dec. 15, 1993.

Gray, Cary G. and Cheriton, David R., "Leases: An Efficient Fault–Tolerant Mechanism for Distributed File Cache Consistency," Computer Science Department, Stanford University, 1989.

Hamilton, Marc A., "Java and the Shift to Net–Centric Computing," Computer, pp. 31–39, Aug. 1996.

Birrell, Andrew, et al., "Network Objects," Digital Systems Research Center, Proceedings of the Fourteenth ACM Symposium on Operating Systems Principles, vol. 27, No. 5, pp. 217–230, Dec. 1993.

Mullender, *Distributed Systems*, Second Edition, Addison–Wesley, 1993.

Howard et al., *Scale and Performance in a Distributed File System*, ACM Transactions on Computer Systems, vol. 6, No. 1, Feb. 1988, pp. 51–81.

Cardelli, *Obliq, A lightweight language for network objects*, Nov. 5, 1993, pp. 1–37.

Dijkstra, *Self–stabilizing Systems in Spite of Distributed Control*, Communications of the ACM, vol. 17, No. 11, Nov. 1974, pp. 643–644.

Ousterhout et al., The Sprite Network Operating System, Computer, IEEE, Feb. 1988, pp. 23–26.

Dourish, A Divergence–Based Model of Synchrony and Distribution in Collaborative Systems, Xerox Technical Report EPC–1194–102, 1994, pp. 1–10.

Sharrott et al., ObjectMap: Integrating High Performance Resources into a Distributed Object–oriented Environment, ICODP, 1995.

Birrell et al., Grapevine: An Exercise in Distributed Computing, Communications of the ACM, vol. 25, No. 4, Apr. 1982, pp. 260–274.

*Transparent Network Computing*, Locus Computing Corporation, Jan. 5, 1995.

Lamport et al., The Byzantine Generals Problem, ACM Transactions on Programming Languages and Systems, vol. 4, No. 3, Jul. 1982, pp. 382–401.

Dolev et al., On the Minimal Synchronism Needed for Distributed Consensus, Journal of the ACM, vol. 34, No. 1, Jan. 1987, pp. 77–97.

Mummert et al., *Long Term Distributed File Reference Tracing: Implementation and Experience*, Carnegie Mellon University School of Computer Science, Nov. 1994, pp. 1–28.

Gelernter et al., *Parallel Programming in Linda*, Yale University, Jan. 1985, pp. 1–21.

Cannon et al., Adding Fault–Tolerant Transaction Processing to Linda, Software–Practice and Experience, vol. 24(5), May 1994, pp. 449–466.

Kambhatla et al., Recovery with Limited Replay: Fault–Tolerant Processes in Linda, Oregon Graduate Institute, Technical Report CSIE 90–019, Sep. 1990, pp. 1–16.

Anderson et al., Persistent Linda: Linda+Transactions+ Query Processing Proceedings of the 13th Symposium on Fault Tolerant Systems, 1994, pp. 93–109.

Gelernter, Generative Communication in Linda, ACM Transactions on Programming Languages and Systems, vol. 7, No. 1, Jan. 1985, pp. 80–112.

Carriero et al., Distributed Data Structures in Linda, Principals of Programming Language, 1986, pp. 1–16.

Pinakis, *Using Linda as the Basis of an Operating System Microkernel*, University of Western Australia, Department of Computer Science, Aug. 1993, pp. 1–165.

IINDA Database Search, Jul. 20, 1995, pp. 1–68.

Carriero et al, *Distributed Data Structures in Linda*, Yale Research Report YALEU/DCS/RR–438, Nov. 1985.

Agha et al., Actorspaces: An Open Distributed Programming Paradigm, University of Illinois, Report No. UIUCDCS–R–92–1766, Open Systems Laboratory TR No. 8, Nov. 1992, pp. 1–12.

Ahmed et al., *A Program Building Tool for Parallel Applications*, Yale University, Dec. 1, 1993, pp. 1–23.

Liskov et al., *Distributed Object Management in Thor*, International Workshop on Distributed Object Management, 1992, pp. 12.

Coulouris et al., *Distributed Systems Concepts and Designs*, Second Edition, Addison–Wesley, 1994.

Jaworski, *Java 1.1 Developer's Guide*, Sams.net, 1997.

Wollrath et al., *A Distributed Object Model for the Java™ System*, USENIX Association, Conference on Object–Oriented Technologies and Systems, Jun. 17–21, 1996.

Harris et al., *Proposal for a General Java Proxy Class for Distributed Systems and Other Uses*, Netscape Communications Corp., Jun. 25, 1997.

Krasner, *The Smalltalk–80 Virtual Machine*, BYTE Publications Inc., Aug. 1991, pp. 300–320.

Birrell et al., Network Objects, DEC SRC Research Report 115, Feb. 28, 1994.

*Remote Method Invocation Specification*, Sun Microsystems, Inc., (1997), http://java.sun.com/products/jdk/1.1/docs/guide/rmi/spec/rmiTOC.doc.html.

Birrell, Andrew D. and Nelson, Bruce Jay, "Implementing Remote Procedure Calls," ACM Transactions on Computer Systems, vol. 2, No. 1, pp. 39–59, Feb. 1984.

Wilson, P.R., et al., "Design of the Opportunistic Garbage Collector," Proceedings of the Object Oriented Programming Systems Languages An Applications Conference, New Orleans, vol. 24, No. 10, Oct. 1989.

Jones, Richard, et al., "Garbage Collection: Algorithms for Automatic Dynamic Memory Management," John Wiley & Sons, Jan. 1996.

Birrell, Andrew, et al., "Distributed Garbage Collection for Network Objects,"Digital Systems Research Center, No. 116, Dec. 15, 1993, pp. 1–18.

Gray, Cary G., Et al., "Leases An Efficient Fault–Tolerant Mechanism for Distributed File Cache Consistency," Computer Science Department, Stanford University, Jan. 1989, pp. 202–210.

Birrell, Andrew, et al., "Network Objects," Digital Equipment Corp. Systems Research Center Technical Report, 27(5), Dec. 1993, pp. 217–230.

Chung, Kin–Man and Yuen, Herbert, "A 'Tiny' Pascal Compiler: the P–Code Interpreter," BYTE Publications, Inc., Sep. 1978.

Chung, Kin–Man and Yuen, Herbert, "A 'Tiny ' Pascal Compiler: Part 2: The P–Compiler," BYTE Publications, Inc., Oct. 1978.

Thompson, Ken, "Regular Expression Search Algorithm," Communications of the ACM, vol. II, No. 6, p. 149 et seq., Jun. 1968.

Mitchell, James G., Maybury, William, and Sweet, Richard, Mesa Language Manual, Xerox Corporation, no date.

McDaniel, Gene, "An Analysis of a Mesa Instruction Set," Xerox Corporation, May 1982.

Pier, Kenneth A., "A Retrospective on the Dorando, A High–Performance Personal Computer," Xerox Corporation, Aug. 1983.

Pier, Kenneth A., "A Retrospective on the Dorando, A High–Performance Personal Computer," IEEE Conference Proceedings, The 10th Annual International Symposium on Computer Architecture, Jan. 1983.

K.Eric Drexler et al.,"Incentive Engineering for Computational Resource Management," The Ecology of Computation, Elsevier Science Publishers B.V. (North Holland), Jan. 1988.

IBM Technical Disclosure Bulletin, Nov. 1973, vol. 16, No. 6, p. 1931.

Cary G. Gray and David R. Cheriton, "Leases: An Efficient Fault–Tolerant Mechanism for Distributed File Cache Consistency", ACM (Association for Computing Machinery), pp. 202–210, 1989.*

Alexander et al., "Active Bridging," Proceedings of the ACM/SIGCOMM'97 Conference, Cannes, France, Sep. 1997.

"Change–Notification Service for Shared Files," IBM Technical Disclosure Bulletin, vol. 36, No. 8, pp. 77–82, XP002108713, New York, US, Aug. 1993.

Beech, et al., "Object Databases as Generalizations of Relational Databases," Computer Standards & Interfaces, vol. 13, Nos. 1/3, pp. 221–230, Amsterdam, NL, Jan. 1991.

Bertino et al., "Object–Oriented Database Management Systems: Concepts and Issues," Computer, vol. 24, No. 4, pp. 33–47, Los Alamitos, CA, Apr. 1991.

Betz, "Interoperable Objects: Laying the Foundation for Distributed Object Computing," Dr. Dobb's Journal, vol. 19, No. 11, p. 18(13), Oct. 1994.

Bevan, "An Efficient Reference Counting Solution To The Distributed Garbage Collection Problem," Parallel Computing, NL, Elsevier Science Publishers, Amsterdam, vol. 9, No. 2, pp. 179–192, Jan. 1989.

Dave et al., "Proxies, Application Interface, And Distributed Systems," Proceedings International Workshop On Object Orientation In Operating Systems, pp. 212–220, Sep. 24, 1992.

Deux et al., "The O2 System," Communications Of The Association For Computing Machinery, vol. 34, No. 10, pp. 34–48, Oct. 1, 1991.

Droms, "RFC 1541 Dynamic Host Configuration Protocol," <http://www.cis.ohio–state.edu/htbin/rfc/rfc1541.html>, pp. 1–33, Oct. 1993.

Emms, "A Definition Of An Access Control Systems Language," Computer Standards And Interfaces, vol. 6, No. 4, pp. 443–454, Jan. 1, 1987.

Gosling et al., "Java (TM) Language Specification," Addison–Wesley, Jan. 1996.

Gottlob et al., "Extending Object–Oriented Systems with Roles," ACM Transactions On Information Systems, vol. 14, No. 3, pp. 268–296, Jul. 1996.

Guth, "JavaOne: Sun to Expand Java Distributed Computing Effort," <http://www.sunworld.com/swol–02–1998/swol–02–sunspots.html>, XP–002109935, p. 1, Feb. 20, 1998.

Hamilton et al., "Subcontract: A Flexible Base For Distributed Programming," Proceedings of 14th Symposium of Operating System Principles, Dec. 1993.

Hunt, "IDF: A Graphical Data Flow Programming Language for Image Processing and Computer Vision," Proceedings of the International Conference on Systems, Man, and Cybernetics, pp. 351–360, Los Angeles, Nov. 4–7, 1990.

IBM (TM) Technical Disclosure Bulletin, "Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM, "Chapter 6—Distributed SOM (DSOM)," SOMobjects Developer Toolkit Users Guide, Version 2.1, p. 6–1–6–90, Oct. 1994.

Kay et al., "An Overview of the Raleigh Object–Oriented Database System," ICL Technical Journal, vol. 7, No. 4, pp. 780–798, Oxford, GB, Nov. 1991.

Kougiouris et al., "Support for Space Efficient Object Invocation in Spring," Sep. 1994.

Lindholm et al., "The Java (TM) Virtual Machine Specification," Addison Wesley, Jan. 1996.

Mitchell et al., "An Overview of the Spring System," Feb. 1994.

Orfali et al., "The Essential Distributed Objects Survival Guide," Chapter 11: Corba Commercial ORBs, pp. 203–215, John Wiley & Sons, Inc., Jan. 1996.

Riggs et al., "Pickling State in the Java (TM) System," USENIX Association Conference on Object–Oriented Technologies and Systems, XP–002112719, pp. 241–250, Jun. 17–21, 1996.

Rosenberry et al., "Understanding DCE," Chapters 1–3, 6, 1992.

Waldo et al., "Events In An RPC Based Distributed System," Proceedings Of The 1995 USENIX Technical Conference, Proceedings USENIX Winter 1995 Technical Conference, New Orleans, LA, USA, 16–20, pp. 131–142, Jan. 1995.

Wu, "A Type System For An Object–Oriented Database System," Proceedings of the International Computer Software and Applications Conference (COMPSAC), Tokyo, Japan, pp. 333–338, Sep. 11–13, 1991.

Yemini et al., "Towards Programmable Networks," IFIP/IEEE International Workshop on Distributed Systems: Operations and Management, L'Aquila, Italy, Oct. 1996.

Aldrich et al., "Providing Easier Access to Remote Objects in Client–Server Systems," System Sciences, 1998, Proceedings of the 31st Hawaii Internat'l. Conference, Jan. 6–9, 1998, pp. 366–375.

Aldrich et al., "Providing Easier Access to Remote Objects in Distributed Systems," Calif. Institute of Technology, www.cs.caltech.edu/%7Ejedi/paper/jedipaper.html, Nov. 21, 1997.

Dave et al., "Proxies, Application Interfaces, and Distributed Systems," XP 002009478, IEEE, Jan. 1992, pp.. 212–220.

Dollimore et al., "The Design of a System for Distributing Shared Objects," The Computer Journal, No. 6, Cambridge, GB, Dec. 1991.

Fleisch et al., "High Performance Distributed Objects Using Distributed Shared Memory & Remote Method Invocation," System Sciences, 1998, Proceedings of the 31st Hawaii Internat'l. Conference, Jan. 6–9, 1998, pp. 574–578.

Guyennet et al., "A New Consistency Protocol Implemented in the CAliF System," IEEE, 1094–7256/97, pp. 82–87, Jan. 1997.

Guyennet et al., "Distributed Shared Memory Layer for Cooperative Work Applications," IEEE, 0742–1303/97, pp. 72–78, Jan. 1997.

IBM Technical Disclosure Bulletin, "Local Network Monitoring to Populate Access Agent Directory," vol. 36, No. 09A, pp. 403–405, Sep. 1993.

MUX–Elektronik, Java 1.1 Interactive Course, www.lls.se/~mux/javaic.html, Jan. 1995.

Stevenson, "Token–Based Consistency of Replicated Servers," IEEE, CH2686–4/89/0000/0179, pp. 179–183, Jan. 1989.

* cited by examiner

METHOD, APPARATUS, AND PRODUCT FOR LEASING OF DELEGATION CERTIFICATES IN A DISTRIBUTED SYSTEM

RELATED APPLICATIONS

This is a continuation-in-part of U.S. patent application Ser. No. 08/729,421, filed on Oct. 11, 1996, U.S. Pat. No. 5,832,529, which is incorporated herein by reference.

The following identified U.S. patent applications are relied upon and are incorporated by reference in this application.

Provisional U.S. Patent Application No. 60/076,048, entitled "Distributed Computing System," filed on Feb. 26, 1998.

U.S. patent application Ser. No. 09/044,923, entitled "Method and System for Leasing Storage," pending, and filed on the same date herewith.

U.S. patent application Ser. No. 09/044,834, entitled "Method, Apparatus and Product for Leasing of Group Membership in a Distributed System," pending, and filed on the same date herewith.

U.S. patent application Ser. No. 09/044,916, entitled "Methods and Systems For Distributed Failure Detection and Recovery Using Leasing," U.S. Pat. No. 6,016,500, and filed on the same date herewith.

U.S. patent application Ser. No. 09/044,933, entitled "Method for Transporting Behavior in Event Based System," pending, and filed on the same date herewith.

U.S. patent application Ser. No. 09/044,919, entitled "Deferred Reconstruction of Objects and Remote Loading for Event Notification in a Distributed System," pending, and filed on the same date herewith.

U.S. patent application Ser. No. 09/044,938, entitled "Methods and Apparatus for Remote Method Invocation," pending, and filed on the same date herewith.

U.S. patent application Ser. No. 09/045,652, entitled "Method and System for Deterministic Hashes to Identify Remote Methods," pending, and filed on the same date herewith.

U.S. patent application Ser. No. 09/044,790, entitled "Method and Apparatus for Determining Status of Remote Objects in a Distributed System," pending, and filed on the same date herewith.

U.S. patent application Ser. No. 09/044,930, entitled "Downloadable Smart Proxies for Performing Processing Associated with a Remote Procedure Call in a Distributed System," pending, and filed on the same date herewith.

U.S. patent application Ser. No. 09/044,917, entitled "Suspension and Continuation of Remote Methods," pending, and filed on the same date herewith.

U.S. patent application Ser. No. 09/044,835, entitled "Method and System for Multi-Entry and Multi-Template Matching in a Database," pending, and filed on the same date herewith.

U.S. patent application Ser. No. 09/044,839, entitled "Method and System for In-Place Modifications in a Database," abandoned, and filed on the same date herewith.

U.S. patent application Ser. No. 09/044,945, entitled "Method and System for Typesafe Attribute Matching in a Database," pending, and filed on the same date herewith.

U.S. patent application Ser. No. 09/044,931, entitled "Dynamic Lookup Service in a Distributed System," pending, and filed on the same date herewith.

U.S. patent application Ser. No. 09/044,939, entitled "Apparatus and Method for Providing Downloadable Code for Use in Communicating with a Device in a Distributed System," pending, and filed on the same date herewith.

U.S. patent application Ser. No. 09/044,826, entitled "Method and System for Facilitating Access to a Lookup Service," pending, and filed on the same date herewith.

U.S. patent application Ser. No. 09/044,932, entitled "Apparatus and Method for Dynamically Verifying Information in a Distributed System," pending, and filed on the same date herewith.

U.S. patent application Ser. No. 09/030,840, entitled "Method and Apparatus for Dynamic Distributed Computing Over a Network," and filed on Feb. 26, 1998, pending.

U.S. patent application Ser. No. 09/044,936, entitled "An Interactive Design Tool for Persistent Shared Memory Spaces," pending, and filed on the same date herewith.

U.S. patent application Ser. No. 09/044,934, entitled "Polymorphic Token-Based Control," pending, and filed on the same date herewith.

U.S. patent application Ser. No. 09/044,915, entitled "Stack-Based Access Control," pending, and filed on the same date herewith.

U.S. patent application Ser. No. 09/044,944, entitled "Stack-Based Security Requirements," pending, and filed on the same date herewith.

U.S. patent application Ser. No. 09/044,837, entitled "Per-Method Designation of Security Requirements," pending, and filed on the same date herewith.

BACKGROUND OF THE INVENTION

A. Field of the Invention

This invention generally relates to data processing systems and, more particularly, to leasing delegation certificates in data processing systems.

B. Description of the Related Art

Proper resource management is an important aspect to efficient and effective use of computers. In general, resource management involves allocating resources (e.g., memory) in response to requests as well as deallocating resources at appropriate times, for example, when the requesters no longer require the resources. In general, the resources contain data referenced by computational entities (e.g., applications, programs, applets, etc.) executing in the computers.

In practice, when applications executing on computers seek to refer to resources, the computers must first allocate or designate resources so that the applications can properly refer to them. When the applications no longer refer to a resource, the computers can deallocate or reclaim the resource for reuse. In computers each resource has a unique "handle" by which the resource can be referenced. The handle may be implemented in various ways, such as an address, array index, unique value, pointer, etc.

Resource management is relatively simple for a single computer because the events indicating when resources can be reclaimed, such as when applications no longer refer to them or after a power failure, are easy to determine. Resource management for distributed systems connecting multiple computers is more difficult because applications in several different computers may be using the same resource.

Disconnects in distributed systems can lead to the improper and premature reclamation of resources or to the failure to reclaim resources. For example, multiple applications operating on different computers in a distributed system may refer to resources located on other machines. If connections between the computers on which resources are located and the applications referring to those resources are interrupted, then the computers may reclaim the resources prematurely. Alternatively, the computers may maintain the resources in perpetuity, despite the extended period of time that applications failed to access the resources.

These difficulties have led to the development of systems to manage network resources, one of which is known as "distributed garbage collection." That term describes a facility provided by a language or runtime system for distributed systems that automatically manages resources used by an application or group of applications running on different computers in a network.

In general, garbage collection uses the notion that resources can be freed for future use when they are no longer referenced by any part of an application. Distributed garbage collection extends this notion to the realm of distributed computing, reclaiming resources when no application on any computer refers to them.

Distributed garbage collection must maintain integrity between allocated resources and the references to those resources. In other words, the system must not be permitted to deallocate or free a resource when an application running on any computer in the network continues to refer to that resource. This reference-to-resource binding, referred to as "referential integrity," does not guarantee that the reference will always grant access to the resource to which it refers. For example, network failures can make such access impossible. The integrity, however, guarantees that if the reference can be used to gain access to any resource, it will be the same resource to which the reference was first given.

Distributed systems using garbage collection must also reclaim resources no longer being referenced at some time in the finite future. In other words, the system must provide a guarantee against "memory leaks." A memory leak can occur when all applications drop references to a resource, but the system fails to reclaim the resource for reuse because, for example, of an incorrect determination that some application still refers to the resource.

Referential integrity failures and memory leaks often result from disconnections between applications referencing the resources and the garbage collection system managing the allocation and deallocation of those resources. For example, a disconnection in a network connection between an application referring to a resource and a garbage collection system managing that resource may prevent the garbage collection system from determining whether and when to reclaim the resource. Alternatively, the garbage collection system might mistakenly determine that, since an application has not accessed a resource within a predetermined time, it may collect that resource. A number of techniques have been used to improve the distributed garbage collection mechanism by attempting to ensure that such mechanisms maintain referential integrity without memory leaks. One conventional approach uses a form of reference counting, in which a count is maintained of the number of applications referring to each resource. When a resource's count goes to zero, the garbage collection system may reclaim the resource. Such a reference counting scheme only works, however, if the resource is created with a corresponding reference counter. The garbage collection system in this case increments the resource's reference count as additional applications refer to the resource, and decrements the count when an application no longer refers to the resource.

Reference counting schemes, however, especially encounter problems in the face of failures that can occur in distributed systems. Such failures can take the form of a computer or application failure or network failure that prevent the delivery of messages notifying the garbage collection system that a resource is no longer being referenced. If messages go undelivered because of a network disconnect, the garbage collection system does not know when to reclaim the resource.

To prevent such failures, some conventional reference counting schemes include "keep-alive" messages, which are also referred to as "ping back." According to this scheme, applications in the network send messages to the garbage collection system overseeing resources and indicate that the applications can still communicate. These messages prevent the garbage collection system from dropping references to resources. Failure to receive such a "keep-alive" message indicates that the garbage collection system can decrement the reference count for a resource and, thus, when the count reaches zero, the garbage collection system may reclaim the resource. This, however, can still result in the premature reclamation of resources following reference counts reaching zero from a failure to receive "keep-alive" messages because of network failures. This violates the referential integrity requirement.

Another proposed method for resolving referential integrity problems in garbage collection systems is to maintain not only a reference count but also an identifier corresponding to each computational entity referring to a resource. See A. Birrell, et al., "Distributed Garbage Collection for Network Objects," No. 116, digital Systems Research Center, Dec. 15, 1993. This method suffers from the same problems as the reference counting schemes. Further, this method requires the addition of unique identifiers for each computational entity referring to each resource, adding overhead that would unnecessarily increase communication within distributed systems and add storage requirements (i.e., the list of identifiers corresponding to applications referring to each resource).

SUMMARY OF THE INVENTION

In accordance with the present invention, referential integrity is guaranteed without costly memory leaks by leasing resources for a period of time during which the parties in a distributed system, for example, an application holding a reference to a resource and the garbage collection system managing that resource, agree that the resource and a reference to that resource will be guaranteed. At the end of the lease period, the guarantee that the reference to the resource will continue lapses, allowing the garbage collection system to reclaim the resource. Because the application holding the reference to the resource and the garbage collection system managing the resource agree to a finite guaranteed lease period, both can know when the lease and, therefore, the guarantee, expires. This guarantees referential integrity for the duration of a reference lease and avoids the concern of failing to free the resource because of network errors. In addition to memory, the leasing technique can be applied to delegation certificates.

Consistent with an alternative embodiment of the present invention, as embodied and broadly described herein, a method for leasing delegation certificates is provided. This method comprises the steps of receiving a lease request from a client specifying a resource and a lease period, determining a lease period during which the client has authority to request from a server access to the resource, advising the client of the granted lease period, granting the client a delegation certificate which the client can use to access the resource from the server.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION

Reference will now be made in detail to an implementation of the present invention as illustrated in the accompanying drawings. Wherever possible, the same reference numbers will be used throughout the drawings and the following description to refer to the same or like parts.

The present invention may be implemented by computers organized in a conventional distributed processing system architecture. The architecture for and procedures to implement this invention, however, are not conventional, because they provide a distributed garbage collection scheme that ensures referential integrity and eliminates memory leaks.

A. Overview

A method invocation (MI) component located in each of the computers in the distributed processing system implements the distributed garbage collection scheme of this invention. The MI component may consist of a number of software modules preferably written in the JAVA™ programming language.

In general, whenever an application in the distributed processing system obtains a reference to a distributed resource, by a name lookup, as a return value to some other call, or another method, and seeks to access the resource, the application makes a call to the resource or to an MI component managing the resource. That MI component, called a managing MI component, keeps track of the number of outstanding references to the resource. When the number of references to a reference is zero, the managing MI component can reclaim the resource. The count of the number of references to a resource is generally called the "reference count" and the call that increments the reference count may be referred to as a "dirty call."

When an application no longer requires a distributed resource, it sends a different call to the resource or the managing MI component. Upon receipt of this call, the managing MI component decrements the reference count for the resource. This call to drop a reference may be referred to as a "clean call."

In accordance with an implementation of the present invention, a dirty call can include a requested time interval, called a lease period, for the reference to the resource. Upon receipt of the dirty call, the managing MI component sends a return call indicating a period for which the lease was granted. The managing MI component thus tracks the lease period for those references as well as the number of outstanding references. Consequently, when the reference count for a resource goes to zero or when the lease period for the resource expires, the managing MI component can reclaim the resource.

B. Procedure

Figure 1:
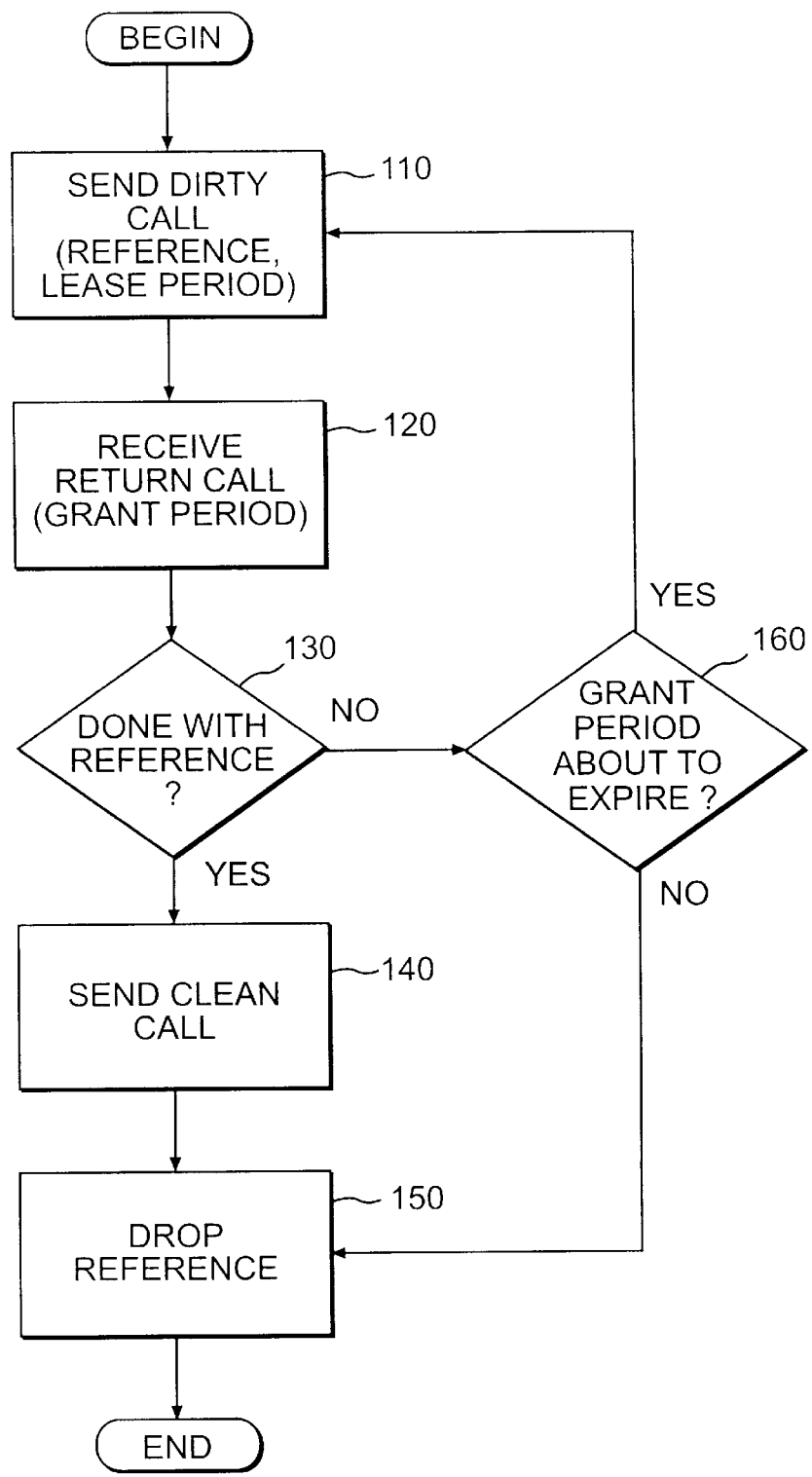
FIG. 1 is a flow diagram of the steps performed by the application call processor according to an implementation of the present invention.

An application call processor in an MI component performs the steps of the application call procedure 100 illustrated in FIG. 1. The server call processor in the managing MI component performs the steps of the procedures 200, 300, and 400 illustrated in FIGS. 2–4, respectively. The managing MI component's garbage collector performs conventional procedures to reclaim resources previously bound to references in accordance with instructions from the server call processor. Accordingly, the conventional procedures of the garbage collector will not be explained.

1. Application Call Processor

FIG. 1 is a flow diagram of the procedure 100 that the application call processor of the MI component uses to handle application requests for references to resources managed by the same or another MI component located in the distributed processing system.

After an application has obtained a reference to a resource, the application call processor sends a dirty call, including the resource's reference and a requested lease period to the managing MI component for the resource (step 110). The dirty call may be directed to the resource itself or to the managing MI component.

The application call processor then waits for and receives a return call from the managing MI component (step 120). The return call includes a granted lease period during which the managing MI component guarantees that the reference of the dirty call will be bound to its resource. In other words, the managing MI component agrees not to collect the resource corresponding to the reference of a dirty call for the grant period. If the managing MI component does not provide a grant period, or rejects the request for a lease, then the application call processor will have to send another dirty call until it receives a grant period.

The application call processor monitors the application's use of the reference and, either when the application explicitly informs the application call processor that the reference is no longer required or when the application call processor makes this determination on its own (step 130), the application call processor sends a clean call to the managing MI component (step 140). In a manner similar to the method used for dirty calls, the clean call may be directed to the referenced resource and the managing MI component will process the clean call. Subsequently, the application call processor eliminates the reference from a list of references being used by the application (step 150).

If the application is not yet done with the reference (step 130), but the application call processor determines that the grant period for the reference is about to expire (step 160), then the application call processor repeats steps 110 and 120 to ensure that the reference to the resource is maintained by the managing MI component on behalf of the application.

2. Server Call Processor

The MI component's server call processor performs three main procedures: (1) handling dirty calls; (2) handling incoming clean calls; and (3) initiating a garbage collection cycle to reclaim resources at the appropriate time.

(i) Dirty Calls

Figure 2:
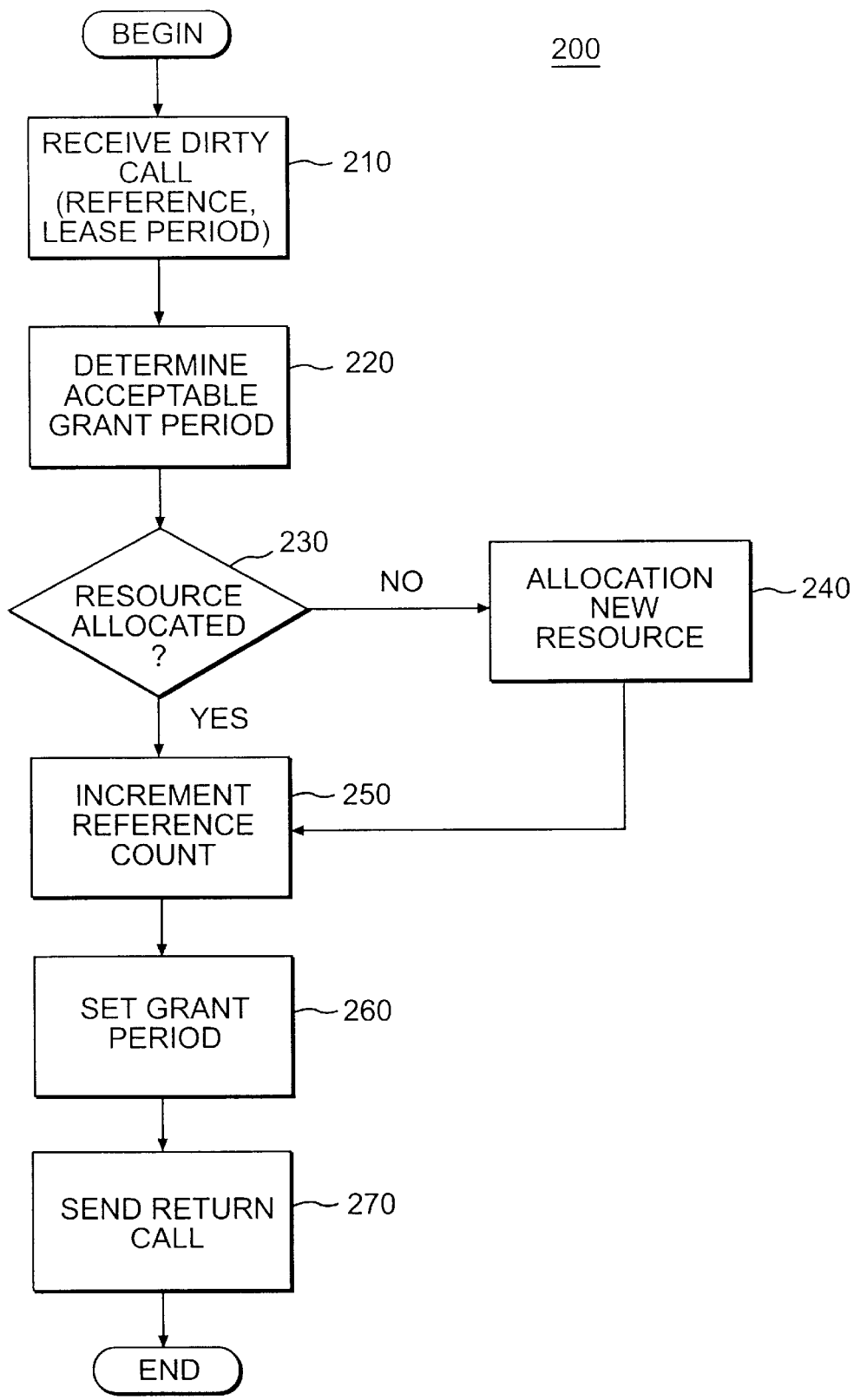
FIG. 2 is a flow diagram of the steps performed by the server call processor to process dirty calls according to the implementation of the present invention.

FIG. 2 is a flow diagram of the procedure 200 that the MI component's server call processor uses to handle requests to reference resources, i.e., dirty calls, that the MI software component manages. These requests come from application call processors of MI components in the distributed processing system, including the application call processor of the same MI component as the server call processor handling requests.

First, the server call processor receives a dirty call (step 210). The server call processor then determines an acceptable grant period (step 220). The grant period may be the same as the requested lease period or some other time period. The server call processor determines the appropriate grant period based on a number of conditions including the amount of resource required and the number of other grant periods previously granted for the same resource.

When the server call processor determines that a resource has not yet been allocated for the reference of a dirty call (step 230), the server call processor allocates the required resource (step 240).

The server call processor then increments a reference count corresponding to the reference of a dirty call (step 250), sets the acceptable grant period for the reference-to-resource binding (step 260), and sends a return call to an application call processor with the grant period (step 270). In this way, the server call processor controls incoming dirty calls regarding references to resources under its control.

Applications can extend leases by sending dirty calls with an extension request before current leases expire. As shown in procedure 200, a request to extend a lease is treated just like an initial request for a lease. An extension simply means that the resource will not be reclaimed for some additional interval of time, unless the reference count goes to zero.

(ii) Clean Calls

Figure 3:
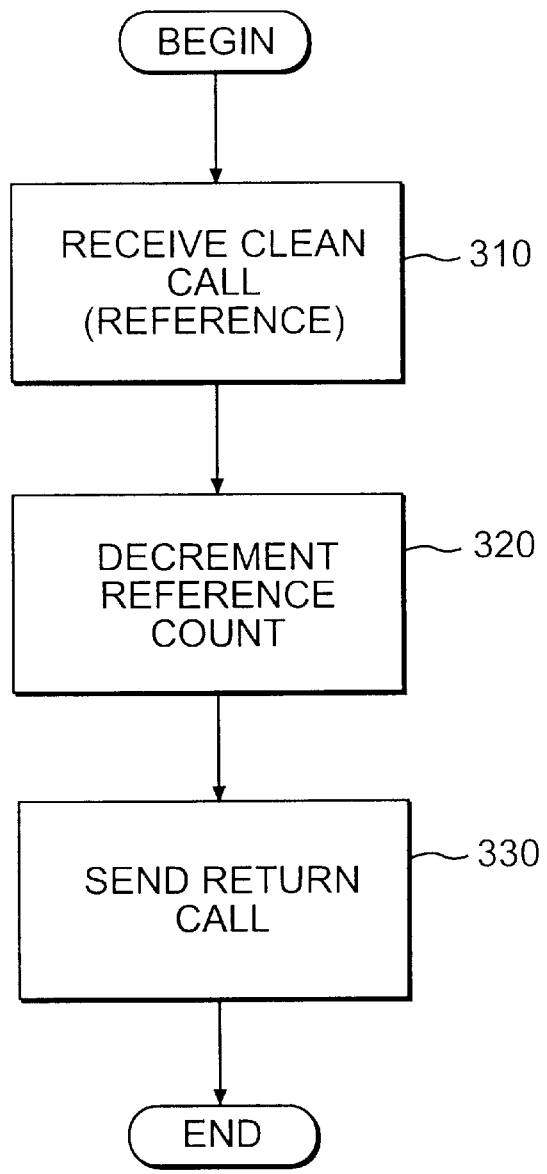
FIG. 3 is a flow diagram of the steps performed by the server call processor to process clean calls according to the implementation of the present invention.
Figure 4:
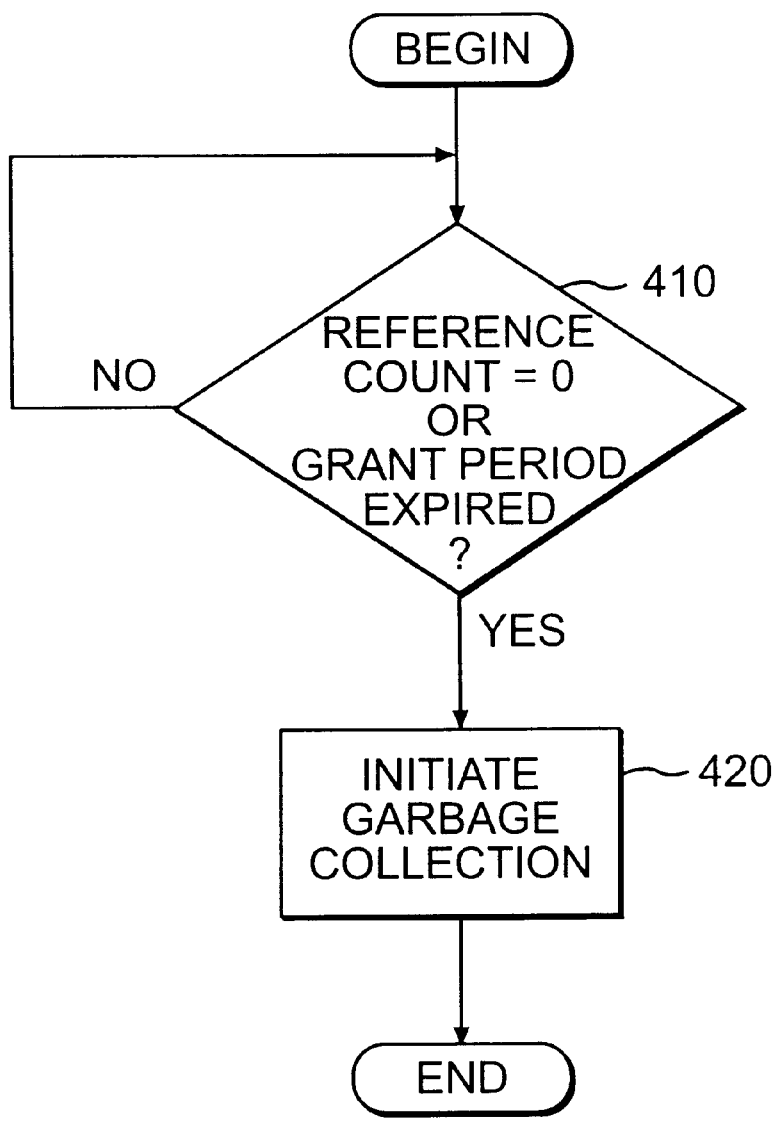
FIG. 4 is a flow diagram of the steps performed by the server call processor to initiate a garbage collection process according to the implementation of the present invention.

The MI component's server call processor also handles incoming clean calls from application call processors. When an application in the distributed processing system no longer requires a reference to a resource, it informs the MI component managing the resource for that reference so that the resource may be reclaimed for reuse. FIG. 3 is a flow diagram of the procedure 300 with the steps that the MI component's server call processor uses to handle clean calls.

When the server call processor receives a clean call with a reference to a resource that the MI component manages (step 310), the server call processor decrements a corresponding reference count (step 320). The clean call may be sent to the resource, with the server call processor monitoring the resource and executing the procedure 300 to process the call. Subsequently, the server call processor sends a return call to the MI component that sent the clean call to acknowledge receipt (step 330). In accordance with this implementation of the present invention, a clean call to drop a reference may not be refused, but it must be acknowledged.

(iii) Garbage Collection

The server call processor also initiates a garbage collection cycle to reclaim resources for which it determines that either no more references are being made to the resource or that the agreed lease period for the resource has expired. The procedure 400 shown in FIG. 4 includes a flow diagram of the steps that the server call processor uses to initiate a garbage collection cycle.

The server call processor monitors reference counts and granted lease periods and determines whether a reference count is zero for a resource managed by the MI component, or the grant period for a reference has expired (step 410). When either condition exists, the server call processor initiates garbage collection (step 420) of that resource. Otherwise, the server call processor continues monitoring the reference counts and granted lease periods.

C. Call Flow

Figure 5:
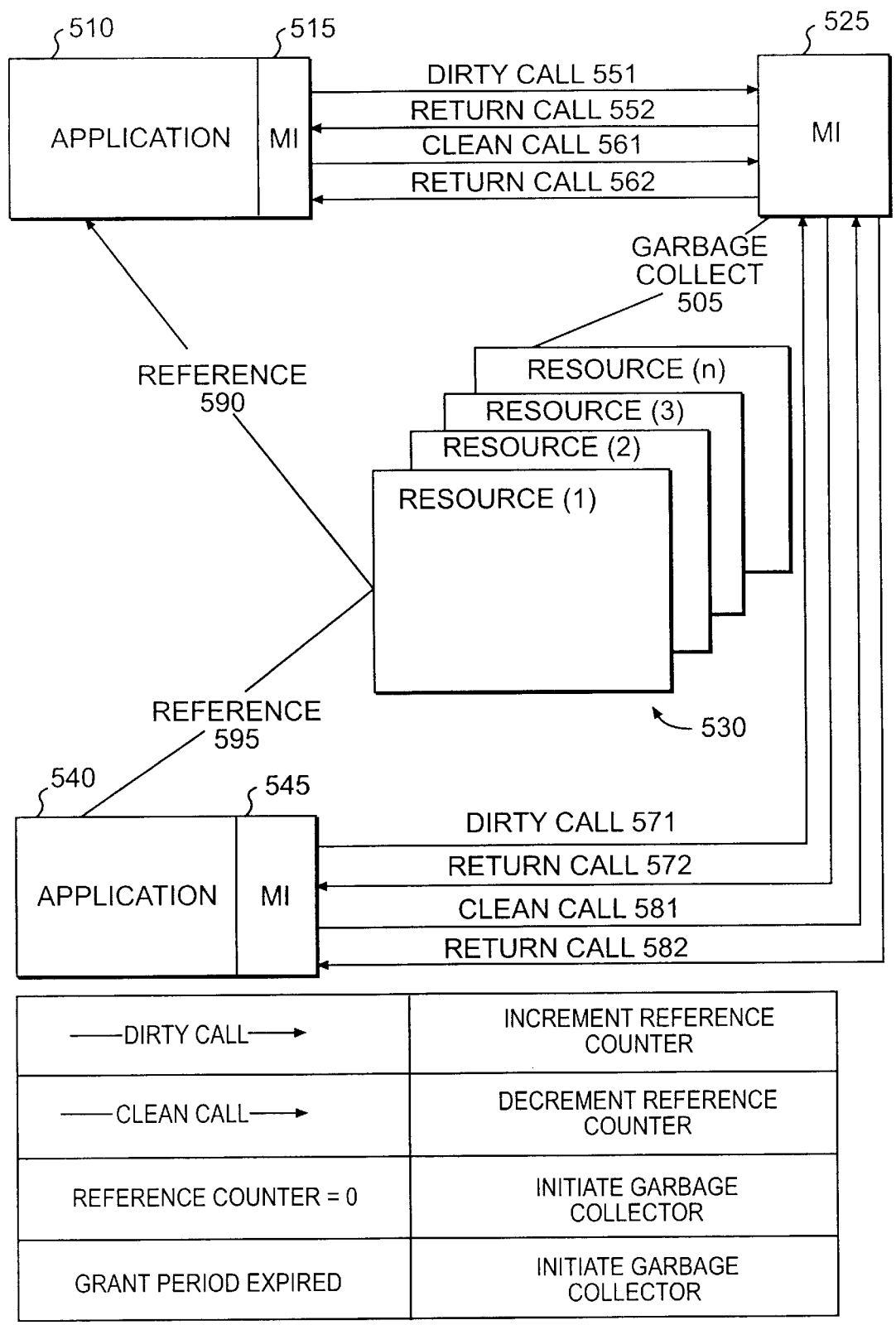
FIG. 5 is a diagram of a preferred flow of calls within a distributed processing system.

FIG. 5 is a diagram illustrating the flow of calls among MI components within the distributed processing system. Managing MI component 525 manages the resources 530 by monitoring the references to those resources 530 (see garbage collect 505). Because the managing MI components 525 manages the resources, the server call processor of managing MI component 525 performs the operations of this call flow description.

FIG. 5 also shows that applications 510 and 540 have corresponding MI components 515 and 545, respectively. Each of the applications 510 and 540 obtains a reference to one of the resources 530 and seeks to obtain access to one of the resources 530 such that a reference is bound to the corresponding resource. To obtain access, applications 510 and 540 invoke their corresponding MI components 515 and 545, respectively, to send dirty calls 551 and 571, respectively, to the MI component 525. Because the MI components 515 and 525 handle application requests for access to resources 530 managed by another MI component, such as managing MI component 525, the application call processors of MI components 515 and 545 perform the operations of this call flow description.

In response to the dirty calls 551 and 571, managing MI component 525 sends return calls 552 and 572, respectively, to each of the MI components 515 and 545, respectively. The dirty calls include granted lease periods for the references of the dirty calls 551 and 571.

Similarly, FIG. 5 also shows MI components 515 and 545 sending clean calls 561 and 581, respectively, to managing MI component 525. Clean calls 561 and 581 inform managing MI component 525 that applications 510 and 540, respectively, no longer require access to the resource specified in the clean calls 561 and 581. Managing MI component 525 responds to clean calls 561 and 581 with return calls 562 and 582, respectively. Return calls 562 and 582 differ from return calls 552 and 572 in that return calls 562 and 582 are simply acknowledgments from MI component 525 of the received clean calls 561 and 581.

Both applications 510 and 540 may request access to the same resource. For example, application 510 may request access to "RESOURCE(1)" while application 540 was previously granted access to that resource. MI component 525 handles this situation by making the resource available to both applications 510 and 540 for agreed lease periods. Thus, MI component 525 will not initiate a garbage collection cycle to reclaim the "RESOURCE(1)" until either applications 510 and 540 have both dropped their references to that resource or the latest agreed periods has expired, whichever event occurs first.

By permitting more than one application to access the same resource simultaneously, the present invention also permits an application to access a resource after it sent a clean call to the managing MI component dropping the reference to the resource. This occurs because the resource is still referenced by another application or the reference's lease has not yet expired so the managing MI component 525 has not yet reclaimed the resource. The resource, however, will be reclaimed after a finite period, either when no more applications have leases or when the last lease expires.

D. MI Components

Figure 6:
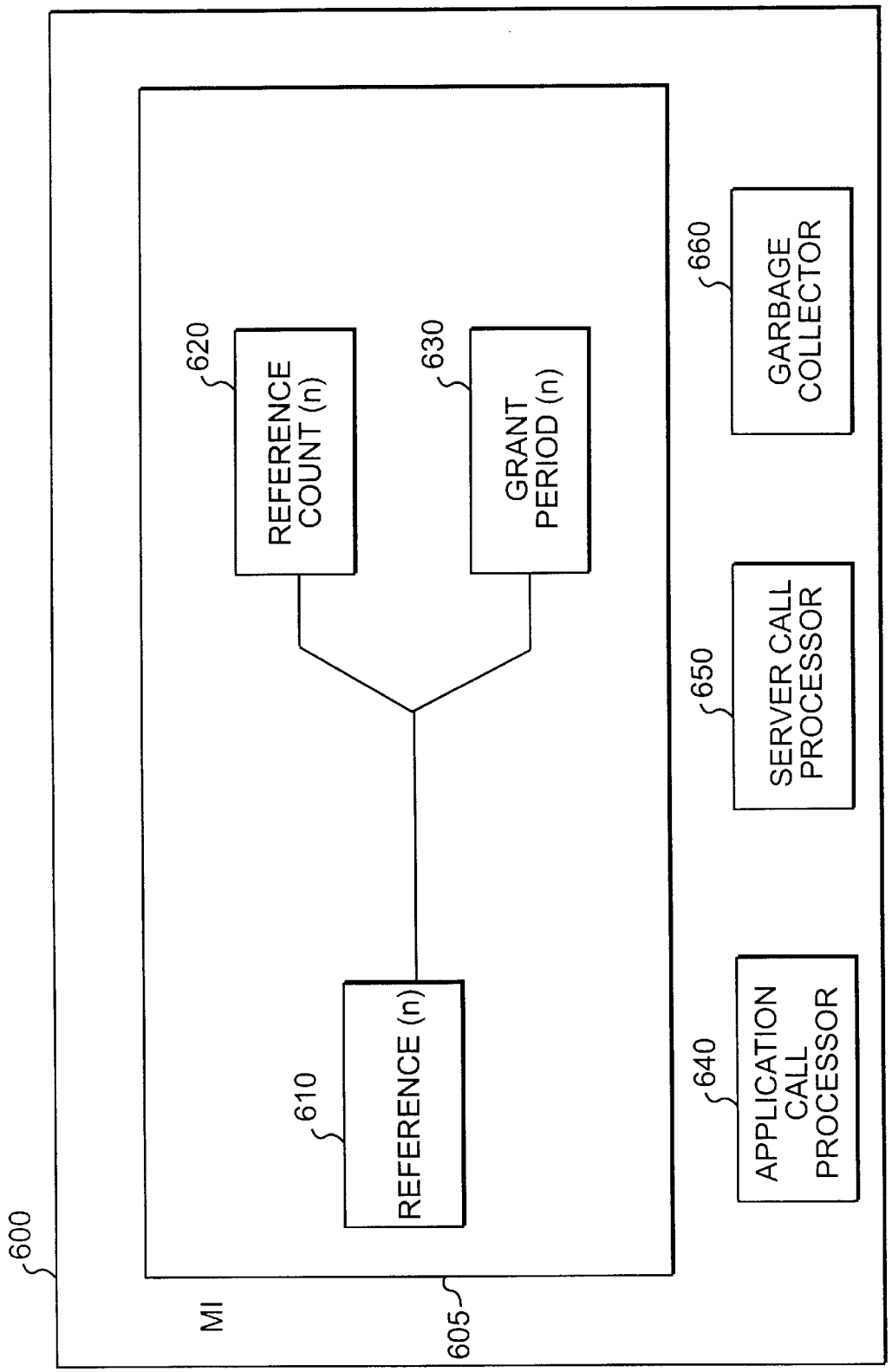
FIG. 6 is a block diagram of the components of the implementation of a method invocation service according to the present invention.

FIG. 6 is a block diagram of the modules of an MI component 600 according to an implementation of the present invention. MI component 600 can include a reference component 605 for each reference monitored, application call processor 640, server call processor 650, and garbage collector 660.

Reference component 605 preferably constitutes a table or comparable structure with reference data portions 610, reference count 620, and grant period register 630. MI component 600 uses the reference count 620 and grant period 630 for each reference specified in a corresponding reference data portion 610 to determine when to initiate garbage collector 660 to reclaim the corresponding resource.

Application call processor 640 is the software module that performs the steps of procedure 100 in FIG. 1. Server call processor 650 is the software module that performs the steps of procedures 200, 300, and 400 in FIGS. 2–4. Garbage collector 660 is the software module that reclaims resources in response to instructions from the server call processor 650, as explained above.

E. Distributed Processing System

Figure 7:
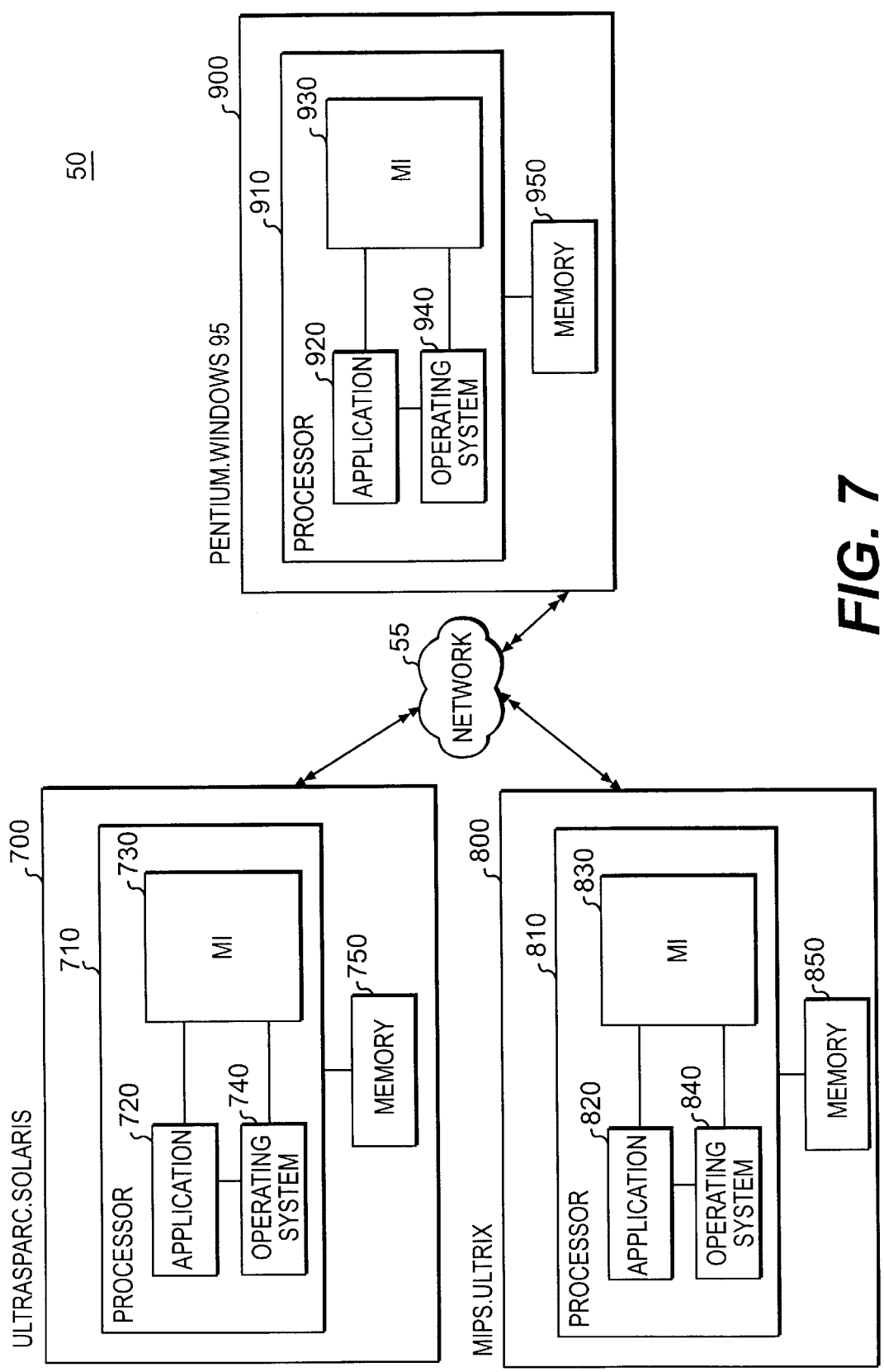
FIG. 7 is a diagram of a distributed processing system that can be used in an implementation of the present invention.

FIG. 7 illustrates a distributed processing system 50 which can be used to implement the present invention. In FIG. 7, distributed processing system 50 contains three independent and heterogeneous platforms 100, 200, and 300 connected in a network configuration represented by the network cloud 55. The composition and protocol of the network configuration represented in FIG. 7 by the cloud 55 is not important as long as it allows for communication of the information between platforms 700, 800 and 900. In addition, the use of just three platforms is merely for illustration and does not limit the present invention to the use of a particular number of platforms. Further, the specific network architecture is not crucial to this invention. For example, another network architecture that could be used in accordance with this invention would employ one platform as a network controller to which all the other platforms would be connected.

In the implementation of distributed processing system 50, platforms 700, 800 and 900 each include a processor 710, 810, and 910 respectively, and a memory, 750, 850, and 950, respectively. Included within each processor 710, 810, and 910, are applications 720, 820, and 920, respectively, operating systems 740, 840, and 940, respectively, and MI components 730, 830, and 930, respectively.

Applications 720, 820, and 920 can be programs that are either previously written and modified to work with the present invention, or that are specially written to take advantage of the services offered by the present invention. Applications 720, 820, and 920 invoke operations to be performed in accordance with this invention.

MI components 730, 830, and 930 correspond to the MI component 600 discussed above with reference to FIG. 6.

Operating systems 740, 840, and 940 are standard operating systems tied to the corresponding processors 710, 810, and 910, respectively. The platforms 700, 800, and 900 can be heterogeneous. For example, platform 700 has an UltraSparc® microprocessor manufactured by Sun Microsystems Corp. as processor 710 and uses a Solaris® operating system 740. Platform 800 has a MIPS microprocessor manufactured by Silicon Graphics Corp. as processor 810 and uses a Unix operating system 840. Finally, platform 900 has a Pentium microprocessor manufactured by Intel Corp. as processor 910 and uses a Microsoft Windows 95 operating system 940. The present invention is not so limited and could accommodate homogenous platforms as well.

Sun, Sun Microsystems, Solaris, Java, and the Sun Logo are trademarks or registered trademarks of Sun Microsystems, Inc. in the United States and other countries. UltraSparc and all other SPARC trademarks are used under license and are trademarks of SPARC International, Inc. in the United States and other countries. Products bearing SPARC trademarks are based upon an architecture developed by Sun Microsystems, Inc.

Memories 750, 850, and 950 serve several functions, such as general storage for the associated platform. Another function is to store applications 720, 820, and 920, MI components 730, 830, and 930, and operating systems 740, 840, and 940 before execution by the respective processor 710, 810, and 910. In addition, portions of memories 750, 850, and 950 may constitute shared memory available to all of the platforms 700, 800, and 900 in network 50.

E. MI Services

The present invention may be implemented using a client/server model. The client generates requests, such as the dirty calls and clean calls, and the server responds to requests.

Figure 8:
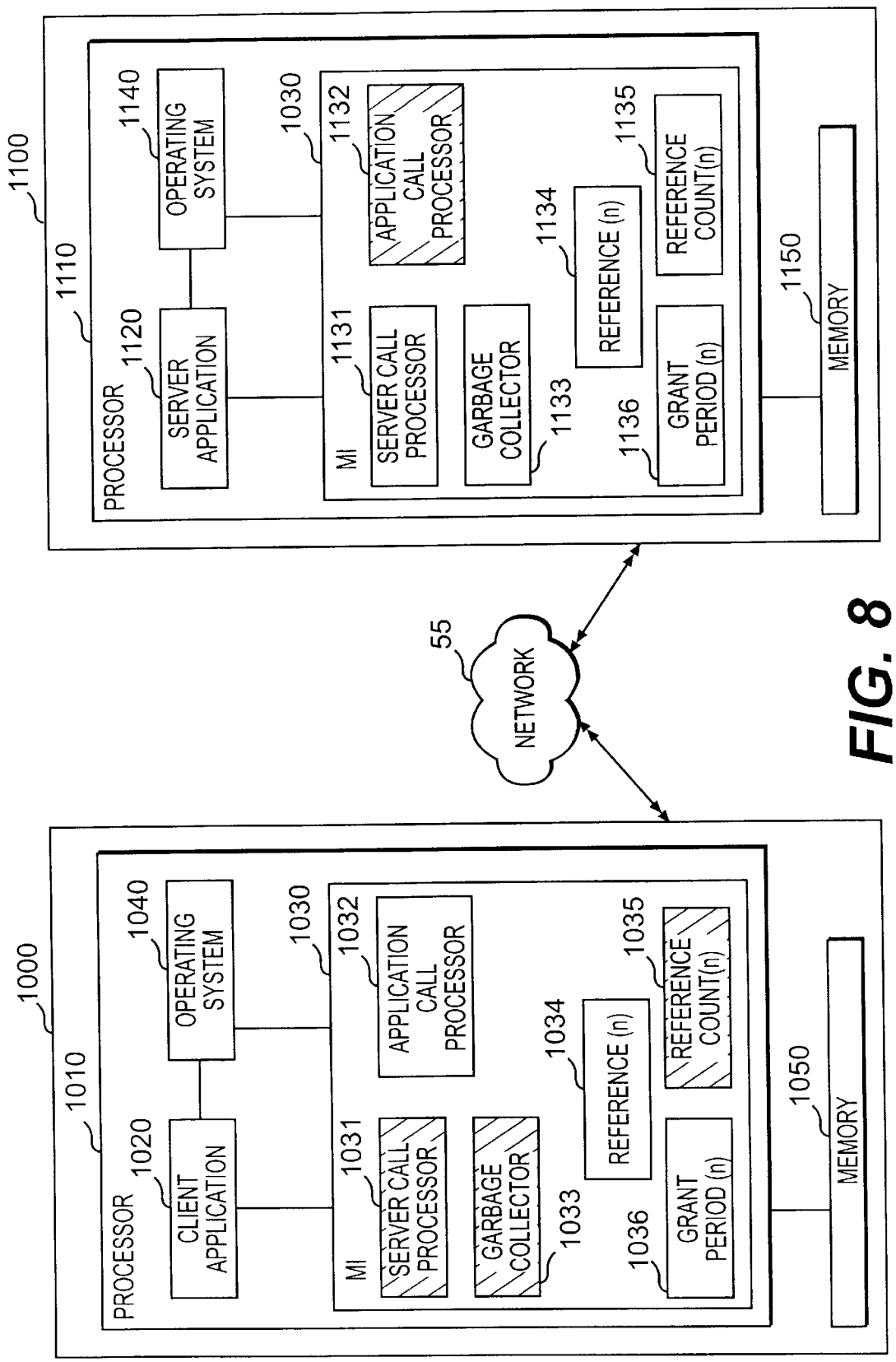
FIG. 8 is a diagram of the individual software components in the platforms of the distributed processing system according to the implementation of the present invention.

Each of the MI components 730, 830 and 930 shown in FIG. 7 preferably includes both client components and server components. FIG. 8, which is a block diagram of a client platform 1000 and a server platform 1100, applies to any two of the platforms 700, 800, and 900 in FIG. 7.

Platforms 1000 and 1100 contain memories 1050 and 1150, respectively, and processors 1010 and 1110, respectively. The elements in the platforms 1000 and 1100 function in the same manner as similar elements described above with reference to FIG. 7. In this example, processor 1010 executes a client application 1020 and processor 1110 executes a server application 1120. Processors 1010 and 1110 also execute operating systems 1040 and 1140, respectively, and MI components 1030 and 1130, respectively.

MI components 1030 and 1130 each include a server call processor 1031 and 1131, respectively, an application call processor 1032 and 1132, respectively, and a garbage collector 1033 and 1133,respectively. Each of the MI components 1030 and 1130 also contains reference components, including reference data portions 1034 and 1134, respectively, reference counts 1035 and 1135, respectively, and grant period registers 1036 and 1136, respectively, for each reference that the respective MI component 1030 or 1130 monitors.

Application call processors 1032 and 1132 represent the client service and communicate with server call processors 1031 and 1131, respectively, which represent the server service. Because platforms 1000 and 1100 contain a server call processor, an application call processor, a garbage collector, and reference components, either platform can act as a client or a server.

For purposes of the discussion that follows, however, platform 1000 is designated the client platform and platform 1100 is designated as the server platform. In this example, client application 1020 obtains references to distributed resources and uses MI component 1030 to send dirty calls to the resources managed by MI component 1130 of server platform 1100.

Additionally, server platform 1100 may be executing a server application 1120. Server application 1120 may also use MI component 1130 to send dirty calls, which may be handled by MI component 1130 when the resources of those dirty calls are managed by MI component 1130. Alternatively, server application 1120 may use MI component 1130 to send dirty calls to resources managed by MI component 1030.

Accordingly, server call processor 1031, garbage collector 1033, and reference count 1035 for MI component 1030 of client platform 1000 are not active and are therefore presented in FIG. 8 as shaded. Likewise, application call processor 1132 of MI component 1130 of the server platform 1100 is shaded because it is also dormant.

When client application 1020 obtains a reference corresponding to a resource, application call processor 1032 sends a dirty call, which server call processor 1131 receives. The dirty call includes a requested lease period. Server call processor 1131 increments the reference count 1135 for the reference in the dirty call and determines a grant period. In response, server call processor 1131 sends a return call to application call processor 1030 with the grant period. Application call processor 1032 uses the grant period to update recorded grant period 1035, and to determine when the resource corresponding to the reference of its dirty call may be reclaimed.

Server call processor 1131 also monitors the reference counts and grant periods corresponding to references for resources that it manages. When one of its reference counts 1135 is zero, or when the grant period 1135 for a reference has expired, whichever event occurs first, server call processor 1131 may initiate the garbage collector 1133 to reclaim the resource corresponding to the reference that has a reference count of zero or an expired grant period.

The leased-reference scheme according to the implementation of the present invention does not require that the clocks on the platforms 1000 and 1100 involved in the protocol be synchronized. The scheme merely requires that they have comparable periods of increase. Leases do not expire at a particular time, but rather expire after a specific time interval. As long as there is approximate agreement on the interval, platforms 1000 and 1100 will have approximate agreement on the granted lease period. Further, since the timing for the lease is, in computer terms, fairly long, minor differences in clock rate will have little or no effect.

The transmission time of the dirty call can affect the protocol. If MI component 1030 holds a lease to reference and waits until just before the lease expires to request a renewal, the lease may expire before the MI component 1130 receives the request. If so, MI component 1130 may reclaim the resource before receiving the renewal request. Thus, when sending dirty calls, the sender should add a time factor to the requested lease period in consideration of transmission time to the platform handling the resource of a dirty call so that renewal dirty calls may be made before the lease period for the resource expires.

F. Conclusion

In accordance with the present invention a distributed garbage collection scheme ensures referential integrity and eliminates memory leaks by providing granted lease periods corresponding to references to resources in the distributed processing system such that when the granted lease periods expire, so do the references to the resources. The resources may then be collected. Resources may also be collected when they are no longer being referenced by processes in the distributed processing system with reference to counters assigned to the references for the resources.

Alternative Embodiment of the Present Invention

The leasing technique, described above, relates to garbage collection. However, an alternative embodiment of the present invention, as described below, can be used with delegation certificates.

A delegation certificate allows one actor ("a delegator") with sufficient privilege to access a resource to delegate its authority to access this resource to another actor ("a delegatee") who then accesses the resource on behalf of the delegator.

However, for security purposes, the delegator may not want to delegate to the delegatee carte blanche permission to access the resource for fear the delegatee may abuse its privilege either intentionally or unintentionally. Thus, the delegator may want to impose limits on the delegatee's access, such as the type of access permitted or the length of time access is permitted. The leasing of delegation certificates allows the delegator to control and limit the delegatee's access, thus providing additional security.

Delegation certificates can be leased to access various resources, such as files. An example of a delegation follows: a delegator may have confidential tax files managed by a file system manager. By prior negotiation, the file system manager will only grant access to these files to the owner, the delegator. However, the owner may need the taxes to be calculated by a tax program, so the owner delegates authority to the tax program, the delegatee, to access the tax files for a limited time, until April 15. Accordingly, the owner grants the tax program permission, via a delegation certificate, to access the files controlled by the file system manager until April 15th. This is accomplished by leasing the delegation certificate to the tax program such that the lease expires on April 15th. If the tax program attempts to access the file after this date, the lease expires and it is prevented from doing so by the file system manager.

The leasing of delegation certificates allows the owner to control or limit access to the files by the tax program. More specifically, the tax program requests a lease from the owner for access to the files stored with the file system manager for read access until April 15th. If a lease is granted, the owner sends to the tax program a delegation certificate that indicates the tax program is entitled to read-only access to the owner's files.

The file system manager has the responsibility of authenticating the delegation certificate as well as to determine the type and length of the tax program's access. At no time can the tax program directly change the contents of the delegation certificate. However, the tax program can request the owner to renew the lease (i.e., if the tax program requires additional time to access the file) or to cancel the lease, (i.e., if the tax program's access is completed before the lease period expires).

The delegation certificate is an object that proves the identity of the delegator and has a set of corresponding rights attached to it. In particular, the delegation certificate object contains a principal identifier, some means for proving the identification, and a specification of the rights. The specification of the rights includes methods for determining the type of access requested and the duration of a lease. In addition, the object includes methods for canceling a lease and for renewing a lease. Finally, the methods may generate exceptions that, when accessed, set forth the reason why invocation of the method was unsuccessful.

The object is an instance of a class that may be extended in many ways to offer more functionality, but the basic class is defined as follows:

```
interface Lease {
    obj FileHandle;
        public void getIdentfier ();
        public void getAuthentication ();
        public void getAccesstype ();
        public long getDuration ();
        public void renew (long renewDuration) throws
            LeaseDeniedException,
            UnknownLeaseException,
            RemoteException;
        public void cancel () throws
            UnknownLeaseException,
            RemoteException
}
```

The principal identifier gives the delegatee the appearance of being the delegator when the delegatee communicates with the system manager. The integrity of the identification is assured by any number of known authentication methods, such as public-key, challenge-response protocol, or shared secret technology.

Invoking the access type method provides the type of access the delegator permits. This method can be invoked by whoever has the delegation certificate, either the delegator, the delegatee, or the file system manager. For instance, the delegates will invoke the method to determine what type of access it is permitted to seek from the file system manager. The file system manager will invoke the method to determine what type of access it is permitted to grant. For example, the delegator may deem a particular file as read-only access. In this case, the file system manager will only allow read access for a subsequently granted lease for that particular file. Conversely, an attempt by the delegatee to write to that storage location would not be permitted by the file system manager.

Invoking the duration method provides the length of the granted lease period. This period represents the most recent lease granted by the delegator.

The renew method permits the renew of the lease, asking for more time, without having to re-initiate the original lease request. Situations where the delegatee may desire to renew the lease include when the original lease proves to be insufficient (i.e., the delegatee requires additional use of the storage location), or when only a partial lease (i.e., less than the requested lease) is granted.

In addition, the renew method can be continually invoked in order to obtain sequential lease periods. The renew method, however, cannot be invoked if the delegatee does not have an active lease. Also, the renew method has no return value; if the renewal is granted, the new lease period will be reflected in the lease object on which the call was made. If the delegator is unable or unwilling to renew the lease, the reason is set forth in the LeaseDeniedException generated by the renew method.

The cancel method is invoked when there is still time left on the lease, but the delegatee no longer desires access. The cancel method may also be invoked by the delegator if, for instance, it wants to cancel the delegatee's access. Thus, cancel allows the file, for example, to be reclaimed. In contrast, upon the end of a lease, (i.e., natural termination occurs), there is no notification obligation by the delegatee.

Figure 9:
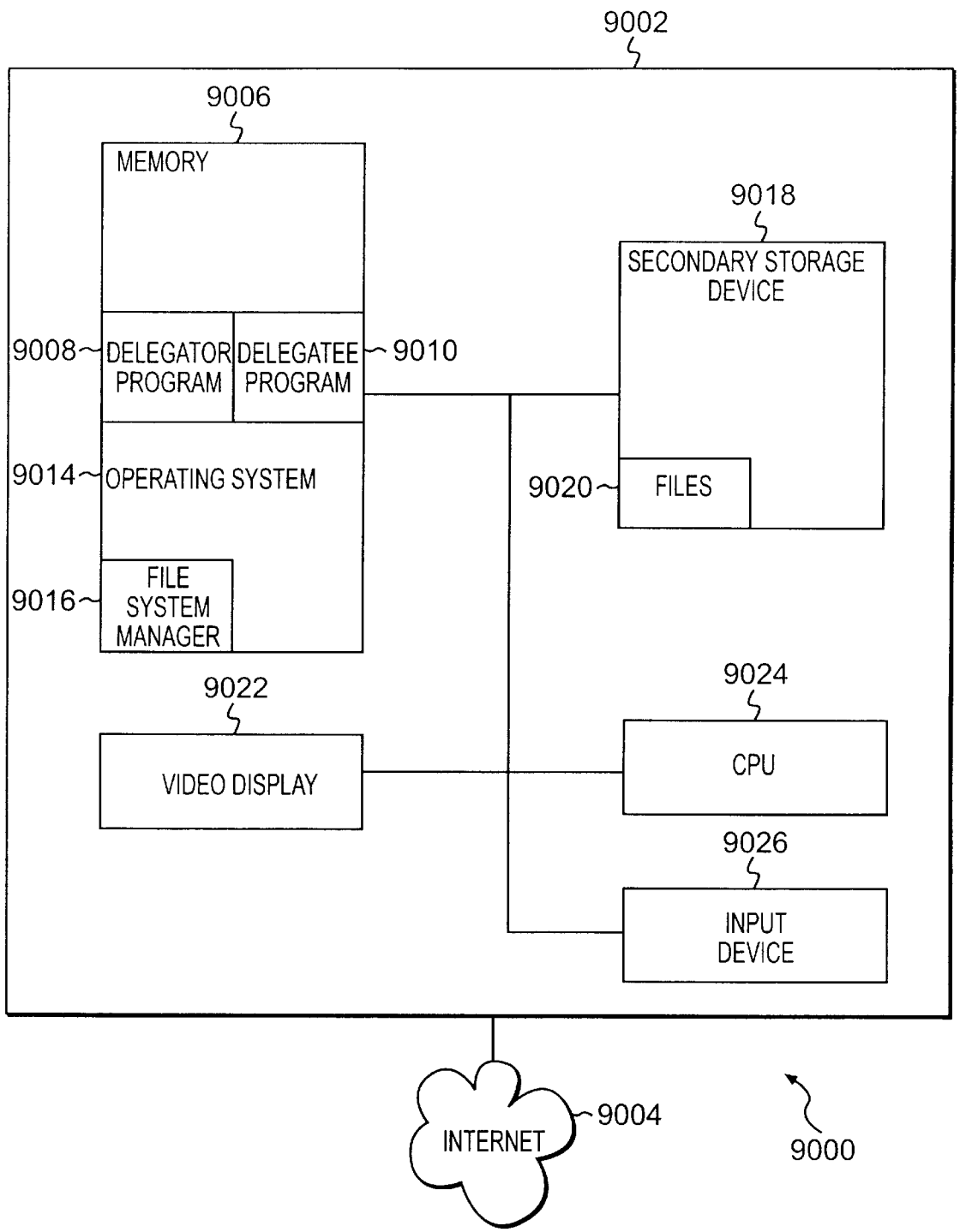
FIG. 9 is a diagram of a data processing system for leasing delegation certificates in a distributed processing system that can be used in an alternative embodiment of the present invention.

FIG. 9 depicts a data processing system 9000 suitable for use for by an alternative embodiment of the present invention. The data processing system 9000 includes a computer system 9002 connected to the Internet 9004. The computer system 9002 includes a memory 9010, a secondary storage device 9018, a central processing unit (CPU) 9024, an input device 9026, and a video display 9022. The secondary storage device 9018 further includes a number of files 9020. The memory 9010 further includes a delegator program 9008, a delegatee program 9010, and an operating system 9014 containing a file system manager 9016. The file system manager 9016 manages files 9020 on the secondary storage device 9018. The delegates 9010 requests access to a secondary storage device 9018 by requesting a lease from the delegator 9008. In response, the delegator 9008 may either grant or deny the lease as further described below. If the delegator 9008 grants the lease to the delegatee 9010, the delegatee 9010 then requests access to the secondary storage device 9018 from the file system manager 9016. One skilled in the art will appreciate that computer 9000 may contain additional or different components.

Although aspects of the alternative embodiment are described as being stored in memory 9010, one skilled in the art will appreciate that these aspects may also be stored in other computer readable media, such as secondary storage devices, like hard disks, floppy disks, or CD-ROM; a carrier wave from the Internet 9004; or other forms of RAM or ROM.

Figure 10:
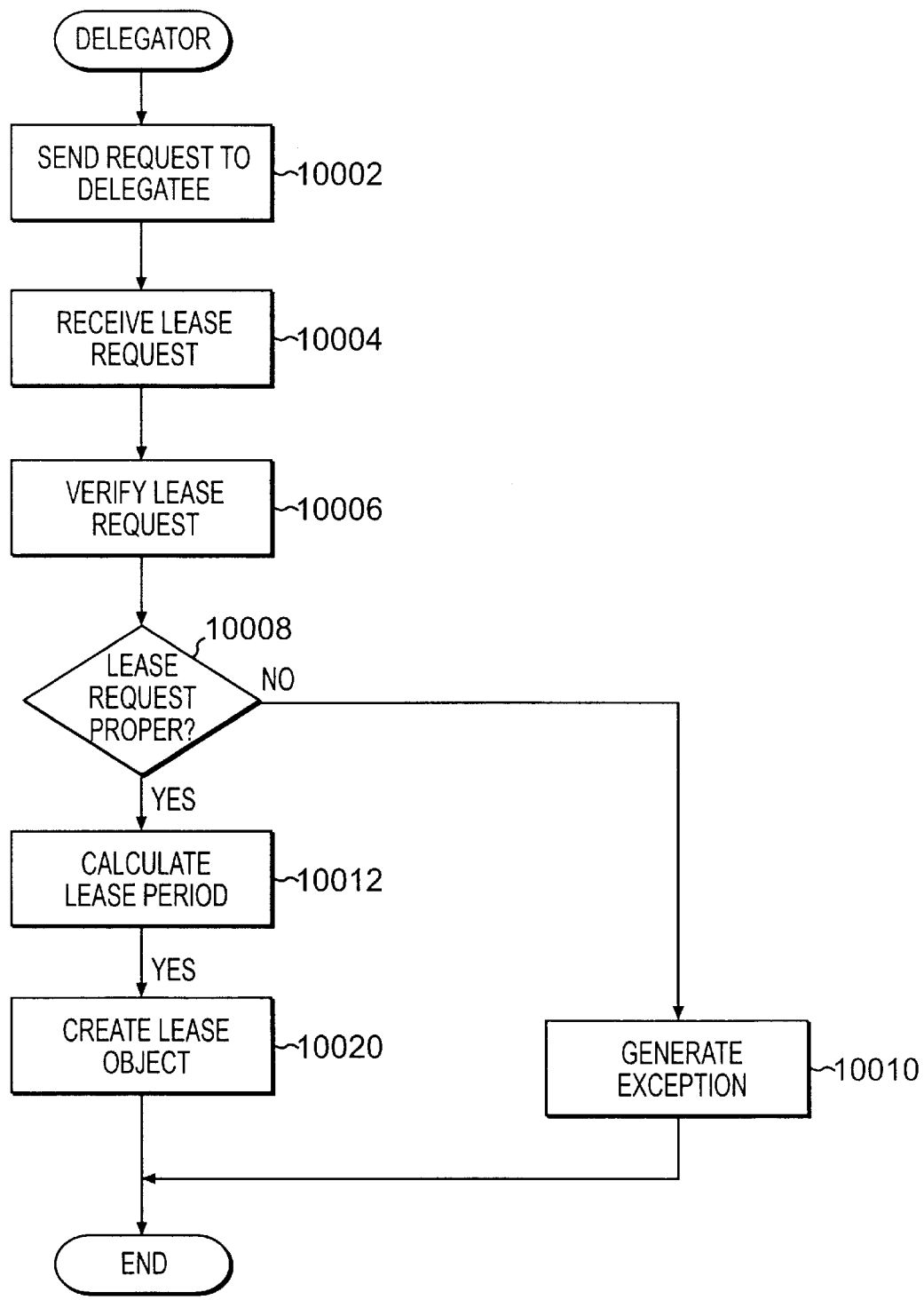
FIG. 10 is a flow diagram of the steps performed by the delegator process when another process (potential delegatee) requests a lease according to an alternative embodiment of the present invention.

FIG. 10 depicts a flow chart of the steps performed by the delegator 9008 when receiving a lease request from the delegatee 9010. The first step performed by the delegator is to request the delegatee to access a resource, such as a file, on the delegator's behalf (step 10002). At some point later, the delegator will receive a lease request from the delegates (step 10004). This request is a function call that includes a number of parameters including (1) the requested file the delegatee wishes to lease, (2) the desired lease period, and (3) the type of access the delegates desires.

The requested file parameter contains an indication of the file to be leased. The desired lease period contains an amount of time the delegatee wants to utilize the file. The type of access requested indicates the type of access the client requested. For example, the delegatee may request read access or write access. To form a valid request, the delegatee request must contain both the file desired and the desired lease. After receiving the request, the delegator examines the parameters to verify the propriety of the request (step 10006).

After examining the parameters, the delegator determines if the request is, in fact, proper (step 10008). For example, the delegator checks if the requested file is a file that the delegator has the ability to lease. Also, the delegator verifies that some lease period is specified. Additionally, the delegator checks if the type of access requested is available. If the delegator determines that the lease request is improper, the delegator generates an exception (step 10010) and processing ends.

If the delegator determines that the lease request is proper, the delegator determines a sufficient lease period (step 10012). For example, if access to the delegator's tax files are requested, the delegator may grant a lease period up to April 15. Next, the delegator creates a lease object and returns the object to the delegatee (step 10020) and processing ends.

Figure 11A:
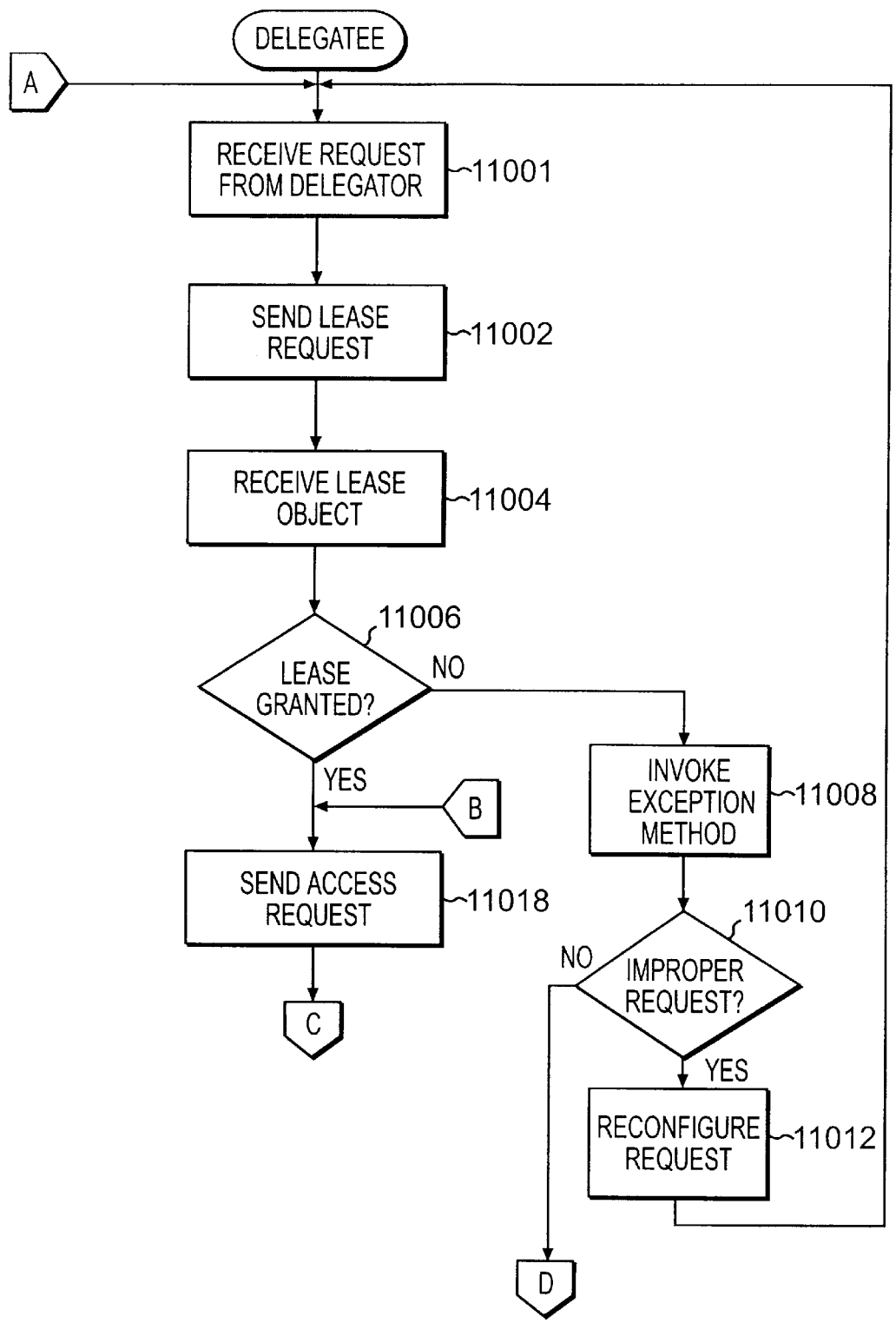
FIG. 11A and FIG. 11B represent a flow diagram of the steps performed by a process (potential delegatee) when requesting a lease from the delegator process according to an alternative embodiment of the present invention.
Figure 11B:
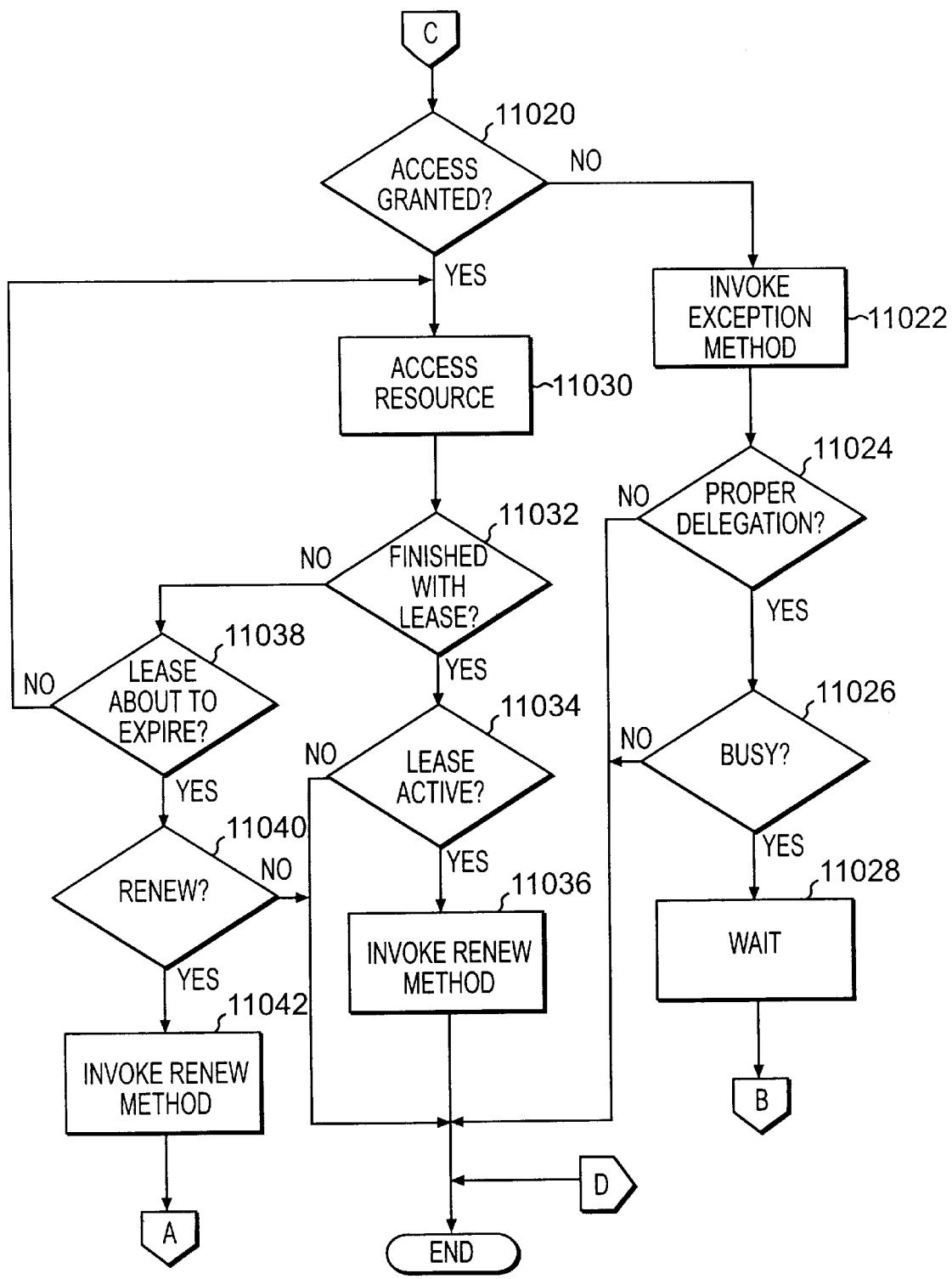

FIGS. 11A and 11B depict a flowchart of the steps performed by the delegatee 9010 when requesting a lease from the delegator 9008. The first step performed by the potential delegatee is to receive a request by the delegatee that entails accessing a file on the delegator's behalf (step 11001). At some point later, the delegatee sends a request for a lease to the delegator (step 11002). This request is a function call and is described in step 10004 in FIG. 10.

After sending the request, the delegatee receives a lease object from the delegator (step 11004). The lease object, as described above, includes the principal identifier, the authentication method, the access-type method, the lease duration method, the renew method, the cancel method.

Next, the delegatee, by examining the lease object, determines if a lease was granted (step 11006). If the delegatee determines that a lease was not granted, the delegatee invokes the exception method (step 11008), which allows the delegatee to determine why a lease was not granted. If the delegatee determines that the lease was not granted because of an improper request (step 11010), the delegates reconfigures the request (step 11012), and processing continues to step 11002. However, if the delegatee determines that the lease was not granted for reasons other than an improper request, processing ends. Note, the delegator may grant multiple leases to the same file, since it is ultimately the responsibility of the file system manager to referee actual access to the file.

If the delegatee, in step 11006, determines that a lease was granted by the delegator, next the delegates requests access to the file from the file system manager, by sending an access request (step 11018). Processing then continues to step 11020 in FIG. 11B.

After the delegatee sends the access request to the file system manager in step 11018 in FIG. 11A, the delegatee determines, by examining the lease object, if the file system manager granted the delegatee access to the file (step 11020) . If the delegates determines that access was not granted by the file system manager, the delegatee invokes the exception method, contained in the object returned by the file system manager, which allows the delegatee to determine why access was not granted (step 11022).

If the delegatee determines that access was not granted because of an improper request (step 11024), processing ends. On the other hand, if the request was proper, the delegatee determines if access was not granted because the file system manager allocated the file to another leaseholder (step 11026). If the delegatee determines the file is busy, the delegatee waits for a predetermined period of time (step 11028) and processing continues to step 11018 in FIG. 11A. If the delegatee determines that access to the file was denied for some other reason, processing ends.

If the delegatee determines, in step 11020, that the file system manager granted the delegates access to the file, then the delegates can access the file (step 11030). Next, the delegatee determines if it is finished accessing the file (step 11032).

If the delegatee's use is completed, the delegatee determines if the lease expired, (i.e., the lease is no longer active) (step 11034). If the lease expired, processing ends and no communication is necessary between the delegatee and the file system manager (i.e., natural termination occurs) . Otherwise, if the lease is still active the delegatee invokes the cancel method (step 11036). The delegatee accesses the cancel method via the lease object. The cancel method informs the file system manager and the delegator that the delegatee is no longer interested in the file. Accordingly, the cancel method allows the file system manager to reclaim the file for use by other lease holders in an expeditious fashion.

If the delegatee determines in step 11032 that it still desires access to the file, the delegatee determines if the lease is about to expire (step 11038). This is achieved by the delegatee comparing the duration of the lease with current time minus the time when the lease was granted. The duration of the lease is found by invoking the duration method. If the lease is not about to expire, the delegatee continues to access the file (step 11030).

However, if the lease is about to expire in step 11038, the delegatee must decide whether or not to renew the lease (step 11040). If the delegatee chooses to renew the lease, the delegatee invokes the renew method of the lease object. If the renew method is invoked, processing continues to step 11002 in FIG. 11A. If the delegates does not renew the lease, then processing ends and no communication is necessary between the delegatee and the file system manager (i.e., natural termination occurs).

Figure 12:
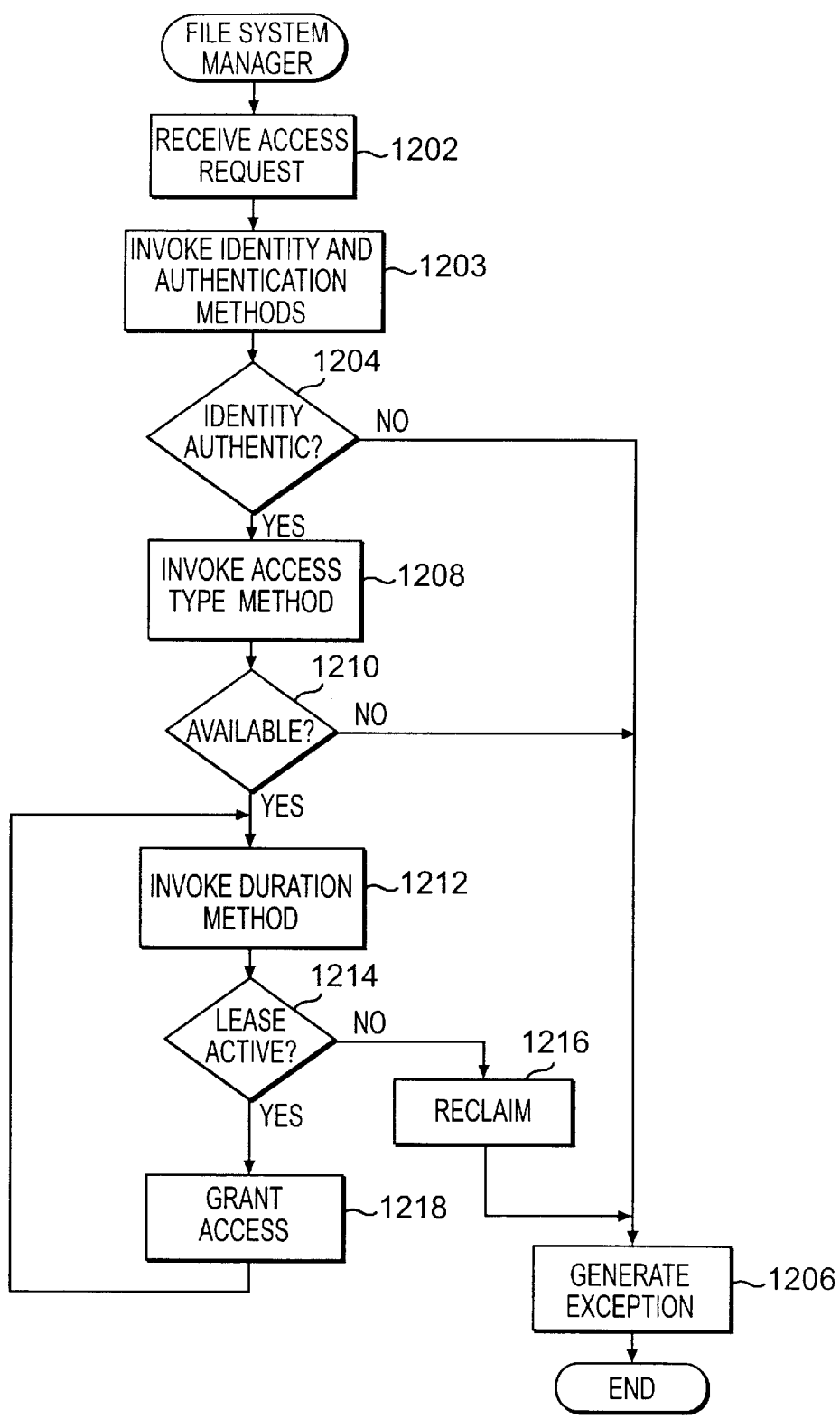
FIG. 12 is a flow diagram of the steps performed by the server when a delegatee requests access to a resource according to an alternative embodiment of the present invention.

FIG. 12 depicts a flow chart of the steps performed by the file system manager 9016 when a delegatee process 9008 requests access to a file. The first step performed by the file system manager is to receive an access request by the delegatee (step 1202). After receiving the request, the file system manager authenticates the delegatee's identity by invoking the principal identifier method and the authentication method, via the lease object (step 1203). If the file system manager determines that the delegatee's lacks the proper identity to access the file (step 1204), the file system manager generates an exception (step 1206) and processing ends.

If the file system manager determines in step 1204 that the delegatee's identity is authentic, the file system manager invokes the getAccess type method (step 1208). By invoking the getAccess type method, the file system manager is able to determine which type of access the delegatee desires. Next, the file system manager determines if the file is available for the type of access requested (step 1210). If the file system manager determines that the file is unavailable, the file system manager generates an exception (step 1206) and processing ends.

If the file system manager determines, in step 1210, that the file is available, the file system manager invokes the duration method (step 1212). The file system manager invokes the duration method in order to determine if there is time left on the delegatee's lease. If the file system manager determines that the delegatee's lease is active (step 1214), the file system manager grants the delegatee access to the file (step 1218). After granting the delegatee access to the file, the file system manager returns to step 1212.

If the file system manager determines in step 1214 that the lease is not active, the file system manager will reclaim the file (step 1216). After reclaiming the file, the file system manager generates an exception (step 1206) and processing ends.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The scope of the invention is defined by the claims and their equivalents.

What is claimed is:

1. A method in a processing system, comprising the steps of:

receiving a lease request from a program, the lease request specifying a resource and a requested lease period;

determining a lease period during which the program has authority to access the resource; and sending to the program a delegation certificate for use by the program to access the resource during the determined lease period.

2. A method for managing a resource in a system that includes a client, a server that manages the resource, and a delegator authorized to use the resource, said method comprising the steps of:

the client receiving from the delegator a lease that delegates to the client use of the resource for a lease period; and the server providing the client with access to the resource for the lease period.

3. The method of claim 2, wherein the receiving step includes the step of:

requesting by the client a lease from the delegator for using the resource.

4. The method of claim 2, wherein the receiving step includes the step of:

providing by the delegator to the client a delegation certificate that delegates to the client the delegator's authority to use the resource.

5. The method of claim 2, wherein the providing step includes the step of:

identifying an identity of the client by invoking code provided by the delegator to the client.

6. The method of claim 2, wherein the providing step includes the step of:

authenticating an identity of the client by invoking code provided by the delegator to the client.

7. The method of claim 2, wherein the providing step includes the step of:

the client managing the lease by invoking code provided by the delegator to the client.

8. A method for managing a resource in a system that includes a client, a server that manages the resource, and a delegator authorized to use the resource, said method comprising the steps of:

the client requesting from the delegator a lease for using the resource;

the delegator granting the requested lease to the client for a lease period; and the client using the resource for the lease period.

9. The method of claim 8, wherein the granting step includes the step of:

determining the lease period during which the client is authorized to use the resource.

10. The method of claim 8, wherein the granting step includes the step of:

providing to the client a delegation certificate that authorizes the client to use the resource for the granted lease period.

11. The method of claim 8, wherein the granting step includes the step of:

providing to the client a method for identifying the client as the delegator to the server.

12. The method of claim 8, wherein the granting step includes the step of:

providing to the client a method for use by the server for authenticating identification of the client.

13. The method of claim 12, wherein the providing step includes the step of:

providing to the client an authentication method that uses a public key.

14. The method of claim 12, wherein the providing step includes the step of:

providing to the client an authentication method that uses a challenge-response protocol.

15. The method of claim 12, wherein the providing step includes the step of:

providing to the client an authentication method that uses a shared secret method.

16. The method of claim 8, wherein the granting step includes the step of:

providing to the client a method for determining a type of access to the resource authorized by the delegator.

17. The method of claim 8, wherein the granting step includes the step of:

providing to the client a method for use by the server for determining a type of access that the server grants to the client for using the resource when the client requests from the server access to the resource.

18. The method of claim 8, wherein the granting step includes the step of:

providing to the client a method for use by the server for determining the lease period.

19. The method of claim 8, wherein the granting step includes the step of:

providing to the client a method for canceling the granted lease when the client completes using the resource.

20. The method of claim 8, wherein the granting step includes the step of:

providing to the client a method for renewing the granted lease when the lease period is near expiration.

21. The method of claim 8, wherein the using step includes the step of:

the client requesting from the server access to the resource according to the granted lease.

22. The method of claim 8, further comprising the step of:

reclaiming the resource by the server when the client cancels the granted lease.

23. The method of claim 8, further comprising the step of:

reclaiming the resource by the server when the granted lease expires.

24. The method of claim 8, further comprising the step of:

the delegator requesting from the client to perform a task that requires use of the resource.

25. The method of claim 8, wherein the using step includes the step of:

the client requesting from the server access to the resource.

26. The method of claim 8, wherein the using step includes the step of:

authenticating by the server, based on a delegation certificate provided by the delegator, an identity of the client when the server receives a request from the client to use the resource.

27. The method of claim 8, wherein the using step includes the step of:

the server determining, based on a delegation certificate provided by the delegator, a type of access by the client to the resource.

28. A data processing system, comprising:

a memory including:

a client program containing first code that requests a lease for accessing a resource;

a delegator program having access to the resource and containing second code for granting the lease to the client for a lease period by providing the client program with a delegation certificate; and a server program containing third code for granting access by the client to the resource based on the delegation certificate; and a processor for running the client program, the server program, and the delegator program.

29. An apparatus, comprising:

a requesting means for requesting access to a resource;

a delegation means for delegating to the requesting means an authorization to access the resource; and a resource allocating means for granting access by the requesting means to the resource based on the delegated authorization.

30. A computer-readable memory device encoded with a data structure for using a resource in a system including a client, a server that manages the resource, and a delegator authorized to access the resource, the data structure comprising:

an object including:

a first method for identifying the client to the server as the delegator when the client requests from the server access to the resource;

a second method for authenticating identification of the client;

a third method for determining type of access by the client to the resource and duration of access by the client to the resource; and a fourth method for managing access by the client to the resource.

31. The computer-readable memory device of claim 30, wherein the fourth method includes a method for renewing a lease granted by the delegator to the client for accessing the resource.

32. The computer-readable memory device of claim 30, wherein the fourth method includes a method for canceling a lease granted by the delegator to the client for accessing the resource.

33. A computer-readable medium containing instructions for controlling a data processing system to perform a method, the data processing system including a client, a server that manages a resource, and a delegator authorized to access the resource, said method comprising the steps of:

the client requesting from the delegator a lease for using the resource;

the delegator providing to the client a delegation certificate that grants the lease to the client for a lease period; and the server granting access to the resource by the client based on the delegation certificate.

34. The computer-readable medium of claim 33, further comprising the step of:

managing by the client the granted lease using the delegation certificate.

35. The computer-readable medium of claim 33, wherein the providing step includes the step of:

providing to the client a method for determining duration of the granted lease period.

36. The computer-readable medium of claim 33, wherein the providing step includes the step of:

providing to the client a method for determining a type of access authorized by the delegator.

37. The computer-readable medium of claim 33, wherein the providing step includes the step of:

providing to the client a method for renewing the granted lease.

38. The computer-readable medium of claim 33, wherein the providing step includes the step of:

providing to the client a method for canceling the granted lease.

39. The computer-readable medium of claim 33, wherein the granting step includes the step of:

invoking a method in the delegation certificate to determine identity of the client.

40. The computer-readable medium of claim 33, wherein the granting step includes the step of:

invoking a method in the delegation certification to authenticate identification of the client.

41. The computer-readable medium of claim 33, wherein the granting step includes the step of:

invoking a method in the delegation certificate to determine a type of access by the client to the resource.

42. The computer-readable medium of claim 33, wherein the granting step includes the step of:

invoking a method in the delegation certificate to determine duration of the granted lease period.

43. A method for using a resource in a system that includes a client, a server that manages the resource, and a delegator authorized to use the resource, said method comprising the steps of:

the client requesting from the delegator a lease for accessing the resource;

the client receiving from the delegator a lease object that delegates an authorization to use the resource for a lease period; and the client accessing the resource according to the delegated authorization.

44. The method of claim 43, further comprising the step of:

the client managing the lease by invoking one or more methods in the lease object.

45. A method for managing a resource in a system that includes a client, a server that manages the resource, and a delegator authorized to use the resource, said method comprising the steps of:

the delegator receiving from the client a request for a lease for accessing the resource; and the delegator providing a lease object that delegates to the client an authorization to use the resource for a lease period.

46. A method for managing a resource in a system that includes a client, a server that manages the resource, and a delegator authorized to use the resource, said method comprising the steps of:

the server receiving from the client a request for accessing the resource, the request having an associated lease object that delegates to the client an authorization from the delegator to access the resource for a lease period;

the server authenticating the request by invoking a first method on the lease object;

the server determining the lease period by invoking a second method on the lease object;

the server determining a type of access by the client to the resource by invoking a third method on the lease object; and the server providing the client with access to the resource when the request is authenticated, the lease period is active, and the type of access is authorized.

* * * * *